United States Patent
Krasulick et al.

(10) Patent No.: US 10,200,131 B2
(45) Date of Patent: Feb. 5, 2019

(54) METHOD AND SYSTEM FOR THE MONOLITHIC INTEGRATION OF CIRCUITS FOR MONITORING AND CONTROL OF RF SIGNALS

(71) Applicant: Skorpios Technologies, Inc., Albuquerque, NM (US)

(72) Inventors: Stephen B. Krasulick, Albuquerque, NM (US); Timothy Creazzo, Albubquerque, NM (US); Kalpit Jha, Albuquerque, NM (US); Elton Marchena, Albuquerque, NM (US); Amit Mizrahi, San Francisco, CA (US)

(73) Assignee: Skorpios Technologies, Inc., Albuquerque, NM (US)

( * ) Notice: Subject to any disclaimer, the term of this patent is extended or adjusted under 35 U.S.C. 154(b) by 0 days.

(21) Appl. No.: 15/947,555

(22) Filed: Apr. 6, 2018

(65) Prior Publication Data

US 2018/0331765 A1    Nov. 15, 2018

Related U.S. Application Data

(63) Continuation of application No. 15/274,714, filed on Sep. 23, 2016, now Pat. No. 9,960,854, which is a
(Continued)

(51) Int. Cl.
*H04B 10/00* (2013.01)
*H04B 10/556* (2013.01)
(Continued)

(52) U.S. Cl.
CPC .... *H04B 10/5561* (2013.01); *H04B 10/07955* (2013.01); *H04B 10/5053* (2013.01);
(Continued)

(58) Field of Classification Search
CPC .... H04B 10/07; H04B 10/075; H04B 10/077; H04B 10/079; H04B 10/0795;
(Continued)

(56) References Cited

U.S. PATENT DOCUMENTS

| | | | |
|---|---|---|---|
| 3,434,056 A | 3/1969 | Becker | |
| 4,777,459 A | 10/1988 | Hudspeth | |

(Continued)

FOREIGN PATENT DOCUMENTS

| | | |
|---|---|---|
| EP | 2003486 A2 | 12/2008 |
| JP | 2007-133176 A | 5/2007 |

(Continued)

OTHER PUBLICATIONS

International Preliminary Report on Patentability dated Mar. 26, 2015 for International Patent Application No. PCT/US2013/053606 filed on Aug. 5, 2013; all pages.
(Continued)

*Primary Examiner* — Daniel Dobson
(74) *Attorney, Agent, or Firm* — Kilpatrick Townsend & Stockton LLP

(57) ABSTRACT

A method of operating a BPSK modulator includes receiving an RF signal at the BPSK modulator and splitting the RF signal into a first portion and a second portion that is inverted with respect to the first portion. The method also includes receiving the first portion at a first arm of the BPSK modulator, receiving the second portion at a second arm of the BPSK modulator, applying a first tone to the first arm of the BPSK modulator, and applying a second tone to the second arm of the BPSK modulator. The method further includes measuring a power associated with an output of the BPSK modulator and adjusting a phase applied to at least
(Continued)

one of the first arm of the BPSK modulator or the second arm of the BPSK modulator in response to the measured power.

17 Claims, 16 Drawing Sheets

Related U.S. Application Data continuation of application No. 15/048,222, filed on Feb. 19, 2016, now Pat. No. 9,479,262, which is a continuation of application No. 13/959,107, filed on Aug. 5, 2013, now Pat. No. 9,300,406.

(60) Provisional application No. 61/680,103, filed on Aug. 6, 2012.

(51) Int. Cl.
*H04B 10/50* (2013.01)
*H04L 27/20* (2006.01)
*H04J 14/02* (2006.01)
*H04B 10/564* (2013.01)
*H04B 10/079* (2013.01)
*H04J 14/00* (2006.01)

(52) U.S. Cl.
CPC ........ *H04B 10/564* (2013.01); *H04J 14/0227* (2013.01); *H04L 27/2096* (2013.01)

(58) Field of Classification Search
CPC ........ H04B 10/07951; H04B 10/07953; H04B 10/07957; H04B 10/0799
See application file for complete search history.

(56) References Cited

U.S. PATENT DOCUMENTS

| | | | |
|---|---|---|---|
| 5,077,728 A | 12/1991 | Kaminow | |
| 5,077,816 A | 12/1991 | Glomb et al. | |
| 5,106,764 A | 4/1992 | Harriott et al. | |
| 5,659,413 A | 8/1997 | Carlson | |
| 6,097,863 A | 8/2000 | Chowdhury | |
| 6,101,026 A | 8/2000 | Baney | |
| 6,546,160 B1 | 4/2003 | Schunk | |
| 7,149,424 B2* | 12/2006 | Kamalov | H04B 10/07953 398/27 |
| 7,209,612 B2 | 4/2007 | Balakrishnan et al. | |
| 7,269,317 B2 | 9/2007 | Blauvelt et al. | |
| 7,317,874 B2 | 1/2008 | Li et al. | |
| 7,526,211 B2 | 4/2009 | McNicol et al. | |
| 7,701,985 B2 | 4/2010 | Webster et al. | |
| 7,937,000 B2 | 5/2011 | Yokoyama | |
| 7,995,893 B2 | 8/2011 | Bi et al. | |
| 8,150,219 B2 | 4/2012 | Nasu et al. | |
| 8,222,084 B2 | 7/2012 | Dallesasse et al. | |
| 8,320,760 B1 | 11/2012 | Lam et al. | |
| 8,615,025 B2 | 12/2013 | Dallesasse et al. | |
| 8,849,072 B2 | 9/2014 | Montoya et al. | |
| 8,897,606 B2 | 11/2014 | Asghari et al. | |
| 9,300,406 B2 | 3/2016 | Krasulick et al. | |
| 9,337,933 B2 | 5/2016 | Mizrahi et al. | |
| 9,479,262 B2 | 10/2016 | Krasulick et al. | |
| 9,960,854 B2 | 5/2018 | Krasulick et al. | |
| 2002/0176144 A1 | 11/2002 | Bergano et al. | |
| 2002/0181067 A1 | 12/2002 | Romanovsky et al. | |
| 2003/0198470 A1 | 10/2003 | Lauder et al. | |
| 2003/0231725 A1 | 12/2003 | Scarpa | |
| 2004/0081470 A1 | 4/2004 | Griffin | |
| 2004/0105611 A1 | 6/2004 | Bischel et al. | |
| 2004/0114872 A1 | 6/2004 | Nagai | |
| 2004/0218870 A1 | 11/2004 | Blauvelt et al. | |
| 2005/0053377 A1 | 3/2005 | Yoo | |
| 2005/0078913 A1 | 4/2005 | Blauvelt et al. | |
| 2005/0117191 A1 | 6/2005 | Griffin | |
| 2005/0213887 A1 | 9/2005 | Balakrishnan et al. | |
| 2006/0002443 A1 | 1/2006 | Farber et al. | |
| 2006/0018584 A1 | 1/2006 | Watts et al. | |
| 2006/0029395 A1 | 2/2006 | Kim et al. | |
| 2006/0034616 A1 | 2/2006 | Tipper | |
| 2006/0097816 A1 | 5/2006 | Nagai | |
| 2006/0153566 A1 | 7/2006 | Sorin et al. | |
| 2006/0165373 A1 | 7/2006 | Blauvelt et al. | |
| 2006/0263098 A1 | 11/2006 | Akiyama et al. | |
| 2007/0133918 A1 | 6/2007 | Cho | |
| 2007/0154221 A1 | 7/2007 | McNicol et al. | |
| 2007/0167815 A1 | 7/2007 | Jacobsen et al. | |
| 2007/0237450 A1 | 10/2007 | Blauvelt et al. | |
| 2007/0237456 A1 | 10/2007 | Blauvelt et al. | |
| 2007/0253661 A1 | 11/2007 | Black et al. | |
| 2007/0280689 A1 | 12/2007 | Boffi et al. | |
| 2007/0280695 A1 | 12/2007 | Li et al. | |
| 2008/0019637 A1 | 1/2008 | Little et al. | |
| 2008/0031572 A1 | 2/2008 | Blauvelt et al. | |
| 2008/0043311 A1 | 2/2008 | Liu et al. | |
| 2008/0181620 A1 | 7/2008 | Sasaki | |
| 2008/0240725 A1 | 10/2008 | Yokoyama | |
| 2009/0010648 A1 | 1/2009 | Zuhdi | |
| 2009/0047019 A1 | 2/2009 | Palacharla et al. | |
| 2009/0047028 A1 | 2/2009 | Terahara et al. | |
| 2009/0110344 A1 | 4/2009 | Little et al. | |
| 2009/0136191 A1 | 5/2009 | Bi et al. | |
| 2009/0162052 A1 | 6/2009 | Xia et al. | |
| 2010/0002989 A1 | 1/2010 | Tokushima | |
| 2010/0054751 A1 | 3/2010 | Murry et al. | |
| 2010/0104237 A1 | 4/2010 | Nasu et al. | |
| 2010/0129077 A1 | 5/2010 | Bainbridge et al. | |
| 2010/0142964 A1 | 6/2010 | Chang et al. | |
| 2010/0209038 A1 | 8/2010 | Popovic et al. | |
| 2010/0316327 A1 | 12/2010 | Montoya et al. | |
| 2010/0316373 A1 | 12/2010 | Chang et al. | |
| 2011/0076025 A1 | 3/2011 | Shimura | |
| 2011/0097075 A1 | 4/2011 | Tanimura | |
| 2011/0135251 A1 | 6/2011 | Kato | |
| 2011/0150384 A1 | 6/2011 | Nagarajan et al. | |
| 2011/0243556 A1 | 10/2011 | Nagarajan et al. | |
| 2011/0262131 A1 | 10/2011 | Gottwald et al. | |
| 2011/0293275 A1 | 12/2011 | Evans et al. | |
| 2011/0311229 A1 | 12/2011 | Kondo et al. | |
| 2012/0039603 A1* | 2/2012 | Wiegner | H04B 10/25758 398/43 |
| 2012/0082465 A1 | 4/2012 | Akiyama et al. | |
| 2012/0121216 A1 | 5/2012 | Oh | |
| 2012/0141128 A1 | 6/2012 | Bai et al. | |
| 2012/0149148 A1 | 6/2012 | Dallesasse et al. | |
| 2012/0155880 A1 | 6/2012 | Nishimoto et al. | |
| 2012/0237220 A1 | 9/2012 | Presi et al. | |
| 2012/0264256 A1 | 10/2012 | Dallesasse et al. | |
| 2012/0275786 A1 | 11/2012 | Grobe | |
| 2012/0288284 A1 | 11/2012 | Yoshida et al. | |
| 2012/0296604 A1 | 11/2012 | Bienstman et al. | |
| 2012/0308240 A1 | 12/2012 | Akiyama | |
| 2012/0315040 A1 | 12/2012 | Dahlfort et al. | |
| 2013/0089319 A1 | 4/2013 | Grobe et al. | |
| 2013/0089324 A1 | 4/2013 | Eiselt | |
| 2013/0142474 A1 | 6/2013 | Dallesasse et al. | |
| 2013/0142475 A1 | 6/2013 | Dallesasse et al. | |
| 2013/0142476 A1 | 6/2013 | Dallesasse et al. | |
| 2013/0183044 A1 | 7/2013 | Stone et al. | |
| 2013/0188904 A1 | 7/2013 | Min et al. | |
| 2013/0216228 A1 | 8/2013 | Nazarathy et al. | |

FOREIGN PATENT DOCUMENTS

| | | |
|---|---|---|
| WO | 2010/137752 A1 | 12/2010 |
| WO | 2010/140186 A1 | 12/2010 |
| WO | 104838 A1 | 9/2011 |

(56) References Cited

FOREIGN PATENT DOCUMENTS

| WO | 2013/096688 A1 | 6/2013 |
|---|---|---|
| WO | 2014/025683 A2 | 2/2014 |

OTHER PUBLICATIONS

International Search Report and Written Opinion dated Dec. 11, 2013 for International Patent Application No. PCT/US2013/053606 filed on Aug. 5, 2013; all pages.
Extended European Search Report dated Mar. 18, 2016 for European Patent Application No. 13827857 filed on Aug. 5, 2013; all pages.
Non-Final Office Action dated Jan. 2, 2015 for U.S. Appl. No. 13/722,132, filed Dec. 20, 2012; all pages.
Final Office Action dated May 5, 2015 for U.S. Appl. No. 13/722,132, filed Dec. 20, 2012; all pages.
International Search Report and Written Opinion dated Mar. 7, 2013 for International Patent Application No. PCT/US2012/071075 filed on Dec. 20, 2012; all pages.
International Preliminary Report on Patentability dated Jul. 3, 2014 for International Paten Application No. PCT/US2012/071075 filed on Dec. 20, 2012; all pages.
Non-Final Office Action dated Feb. 24, 2014 for U.S. Appl. No. 13/491,395, filed Jun. 7, 2012; all pages.
Non-Final Office Action dated Jun. 20, 2014 for U.S. Appl. No. 13/491,360, filed Jun. 7, 2012; all pages.
Non-Final Office Action dated Jun. 20, 2014 for U.S. Appl. No. 13/491,395, filed Jun. 7, 2012; all pages.
Office Action dated Oct. 8, 2014 for U.S. Appl. No. 13/491,360, filed Jun. 7, 2012; all pages.
Final Office Action dated Oct. 29, 2014 for U.S. Appl. No. 13/491,395, filed Jun. 7, 2012; all pages.
English translation of Office Action dated Jul. 11, 2017 for Japanese Patent Application No. 2015-526604; all pages.
Notice of Allowance dated Feb. 17, 2017 for U.S. Appl. No. 15/096,017; all pages.
Notice of Allowance dated Jan. 26, 2017 for U.S. Appl. No. 15/274,714, 5 pages.
Notice of Allowance dated Sep. 25, 2017 for U.S. Appl. No. 15/274,714, 5 pages.
Non-Final Office Action dated May 15, 2017 for U.S. Appl. No. 15/274,714, 8 pages.
EP13827857.7 received an Office Action dated Jun. 5, 2018, 5 pages.

* cited by examiner

METHOD AND SYSTEM FOR THE MONOLITHIC INTEGRATION OF CIRCUITS FOR MONITORING AND CONTROL OF RF SIGNALS

CROSS-REFERENCES TO RELATED APPLICATIONS

This application is a continuation of U.S. patent application Ser. No. 15/274,714, filed on Sep. 23, 2016, entitled "Method And System For The Monolithic Integration Of Circuits For Monitoring And Control Of RF Signals," which is a continuation of U.S. patent application Ser. No. 15/048,222, filed on Feb. 19, 2016, entitled "Method And System For The Monolithic Integration Of Circuits For Monitoring And Control Of RF Signals," now U.S. Pat. No. 9,479,262, issued Oct. 25, 2016, which is a continuation of U.S. patent application Ser. No. 13/959,107, filed on Aug. 5, 2013, entitled "Method And System For The Monolithic Integration Of Circuits For Monitoring And Control Of RF Signals," now U.S. Pat. No. 9,300,406, issued on Mar. 29, 2016, which claims priority to U.S. Provisional Patent Application No. 61/680,103, filed on Aug. 6, 2012, entitled "Method And System For The Monolithic Integration Of Circuits For Monitoring And Control Of RF Signals." The disclosures of all of the above-identified patent applications are incorporated by reference in their entireties for all purposes.

SUMMARY OF THE INVENTION

Embodiments of the present invention relate to RF circuits. More particularly, embodiments of the present invention relate to an apparatus and method of integrating analog circuits (e.g., monolithic integration) used to monitor spectral information associated with RF signals, with particular applications in photonic integrated circuits.

In some embodiments, monolithically integrated circuits are used to monitor and control RF signals. As described herein, some implementations utilize analog circuits that are monolithically integrated and are used to monitor the spectrum of RF signals, providing novel control loops for optical phase shift keying modulation implementations. Some embodiments use analog circuits to filter out a portion of the spectrum (possibly of a digital signal) that is monitored, and then an analog circuit, such as a peak detector or RMS detector to monitor the power in real time.

According to an embodiment of the present invention, a method of operating a BPSK modulator is provided. The method includes receiving an RF signal at the BPSK modulator and splitting the RF signal into a first portion and a second portion that is inverted with respect to the first portion. The method also includes receiving the first portion at a first arm of the BPSK modulator, receiving the second portion at a second arm of the BPSK modulator, applying a first tone to the first arm of the BPSK modulator, and applying a second tone to the second arm of the BPSK modulator. The method further includes measuring a power associated with an output of the BPSK modulator and adjusting a phase applied to at least one of the first arm of the BPSK modulator or the second arm of the BPSK modulator in response to the measured power.

According to another embodiment of the present invention, a method of operating a QPSK modulator is provided. The method includes receiving an optical signal at a first BPSK modulator and generating a first modulated signal at an output of the first BPSK modulator. The method also includes receiving the optical signal at a second BPSK modulator and generating a second modulated signal at an output of the second BPSK modulator. The method further includes combining the first modulated signal and the second modulated signal at an output of the QPSK modulator, measuring a power associated with the output of the QPSK modulator, and adjusting a phase applied to the output of at least one of the first BPSK modulator or the second BPSK modulator in response to the measured power.

According to a particular embodiment of the present invention, a nested Mach-Zehnder modulator system is provided. The nested Mach-Zehnder modulator system includes an optical input port and an optical coupler coupled to the optical input port and having a first arm and a second arm. The nested Mach-Zehnder modulator system also includes a first inner Mach-Zehnder modulator (MZM) coupled to the first arm. The first inner MZM comprises a phase control section and an output. The nested Mach-Zehnder modulator system further includes a first optical detector coupled to the output of the first MZM, a feedback loop connecting the first optical detector to the phase control section, a second inner MZM coupled to the second arm and having a second phase control section and an output, and a second optical coupler receiving the output of the first MZM and the output of the second MZM.

According to a specific embodiment of the present invention, an apparatus is provided. The apparatus includes a receiver coupled to a communications channel operable to carry an RF signal and a feedback loop coupled to a transmitter. The apparatus also includes an analog circuit coupled to the receiver and operable to monitor the RF signal. The analog circuit can include a spectral monitoring unit. The receiver can include a transceiver, which can be integrated in silicon photonics. In some embodiments, the analog circuit includes a plurality of spectral filters characterized by a differing spectral bands and a plurality of RMS detectors, each of the RMS detectors being coupled to one of the plurality of spectral filters.

According to another specific embodiment of the present invention, a method is provided. The method includes receiving an RF signal at an input of a monolithically integrated analog circuit and measuring the RF signal using the monolithically integrated analog circuit. The method also includes providing a feedback signal based on the measured RF signal. The monolithically integrated analog circuit can include an RMS detector. In some embodiments, measuring the RF signal comprises measuring a power associated with the RF signal in one or more predetermined spectral bands. As an example, the one or more predetermined spectral bands can be three spectral bands.

Numerous benefits are achieved by way of the present invention over conventional techniques. For example, embodiments of the present invention provide methods and systems that avoid heavy digital sampling and processing, which are associated with high power and cost. These and other embodiments of the invention along with many of its advantages and features are described in more detail in conjunction with the text below and attached figures.

DETAILED DESCRIPTION OF SPECIFIC EMBODIMENTS

According to an embodiment of the present invention, control loops for quadrature phase shift keying (QPSK) modulators are provided. In contrast with conventional techniques that sample the signal, perform a fast Fourier transform (FFT), and extract a spectral signal to control the RF signal, embodiments of the present invention utilize analog circuits that can be monolithically integrated with photonic circuits, including silicon photonics, to monitor the RF signal and provide the desired feedback signal. Thus, embodiments of the present invention reduce the computational complexity, power requirements, cost, and the like of integrated optoelectronics.

Figure 1A:
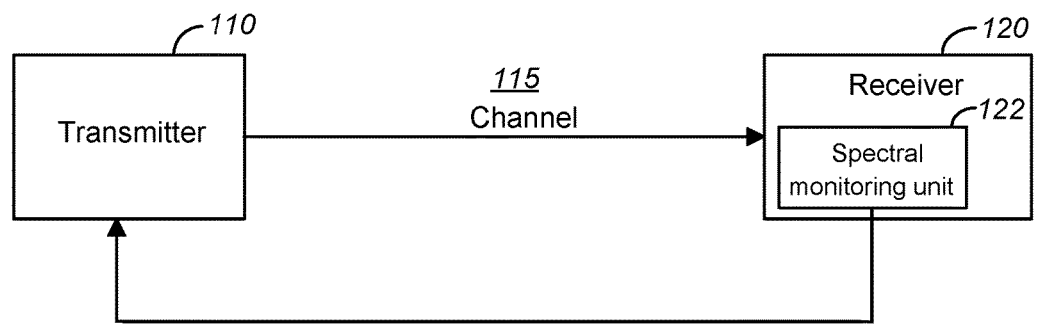
FIG. 1A is a block diagram illustrating a communication system according to an embodiment of the present invention.

FIG. 1A is a block diagram illustrating a communication system according to an embodiment of the present invention. The communications system provides methods and systems for signal monitoring and spectrum equalization. Transmitter 110 and receiver 120 are utilized in conjunction with communications channel 115. In the embodiment illustrated in FIG. 1A, the spectral monitoring unit 122 included as part of the receiver 120 provides feedback on channel distortion to a transmitter 110, thereby allowing the transmitter to compensate for the channel distortion and correct the spectrum. Feedback from the spectral monitoring unit 122 is provided using feedback path 130 in the illustrated embodiment.

In a first embodiment of the present invention, an RF signal is monitored to detect channel distortion and provide feedback to a receiver, in order to equalize the signal spectrum.

Figure 1B:
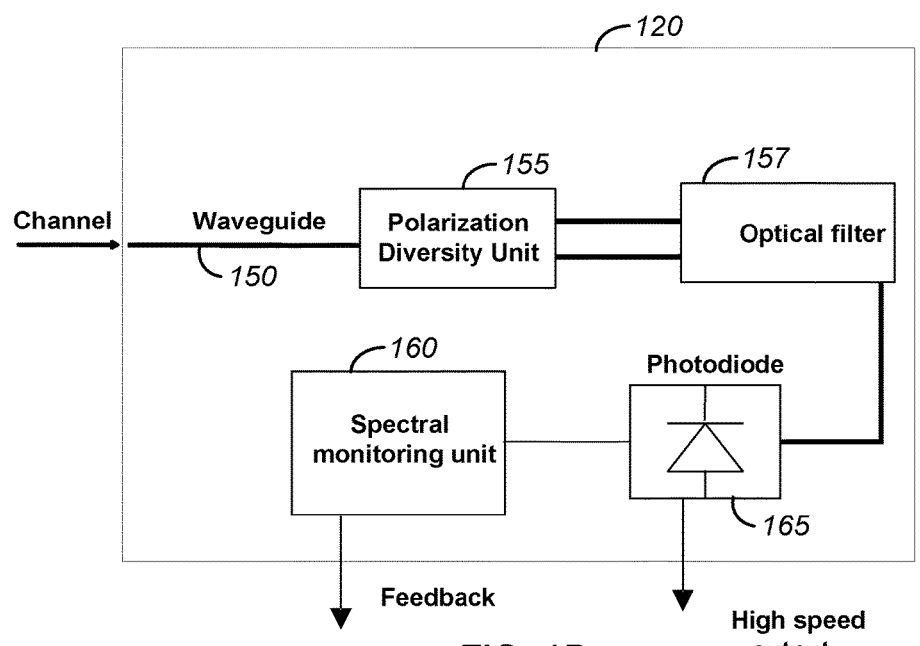
FIG. 1B is a simplified block diagram illustrating elements of a receiver according to an embodiment of the present invention.

FIG. 1B is a simplified block diagram illustrating elements of receiver 120 according to an embodiment of the present invention. The receiver 120 (e.g., an integrated optical receiver) receives a signal over a channel and couples the signal into a waveguide 150. After the Polarization Diversity Unit (e.g. splitter and rotator) 155 there can be two waveguides (e.g. for TE polarized light and TM light rotated to TE polarization). Optical filter 157 is illustrated, which can be a WDM filter. Light is detected by photodiode 165 and passed to spectral monitoring unit 160. It should be noted that there can be a plurality of waveguides and photodiodes. Also, the methods and systems described herein can be used outside of optics (i.e., the channel does not have to be an optical channel). It should be appreciated that the elements illustrated in FIG. 1B are only exemplary and are not required by the present invention and can be utilized, replaced, or removed depending on the particular application.

Figure 2:
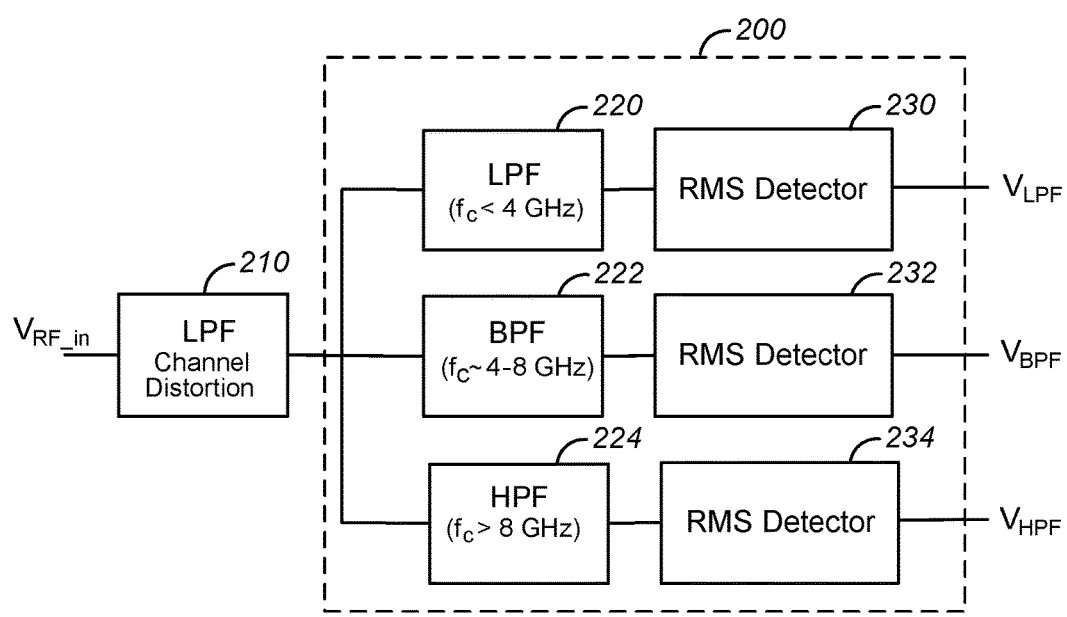
FIG. 2 is simplified block diagram of spectral monitoring unit according to an embodiment of the present invention.

FIG. 2 is simplified block diagram of spectral monitoring unit according to an embodiment of the present invention. The spectral monitoring unit 200 includes a set of three spectral filters: low pass filter (LPF) 220, which passes frequencies less than 4 GHz; band pass filter (BPF) 222, which passes frequencies between 4 GHz and 8 GHz; and high pass filter (HPF) 224, which passes frequencies above 8 GHz. The spectral monitoring unit 200 also includes a set (e.g., three) RMS detectors 230, 232, and 234, which receive the outputs of the corresponding filters 220, 222, and 224, respectively. Utilizing the spectral monitoring unit 200, the distortion as a function of frequency can be measured and feedback can be provided to the transmitter to compensate for the distortion in the channel.

Figure 5:
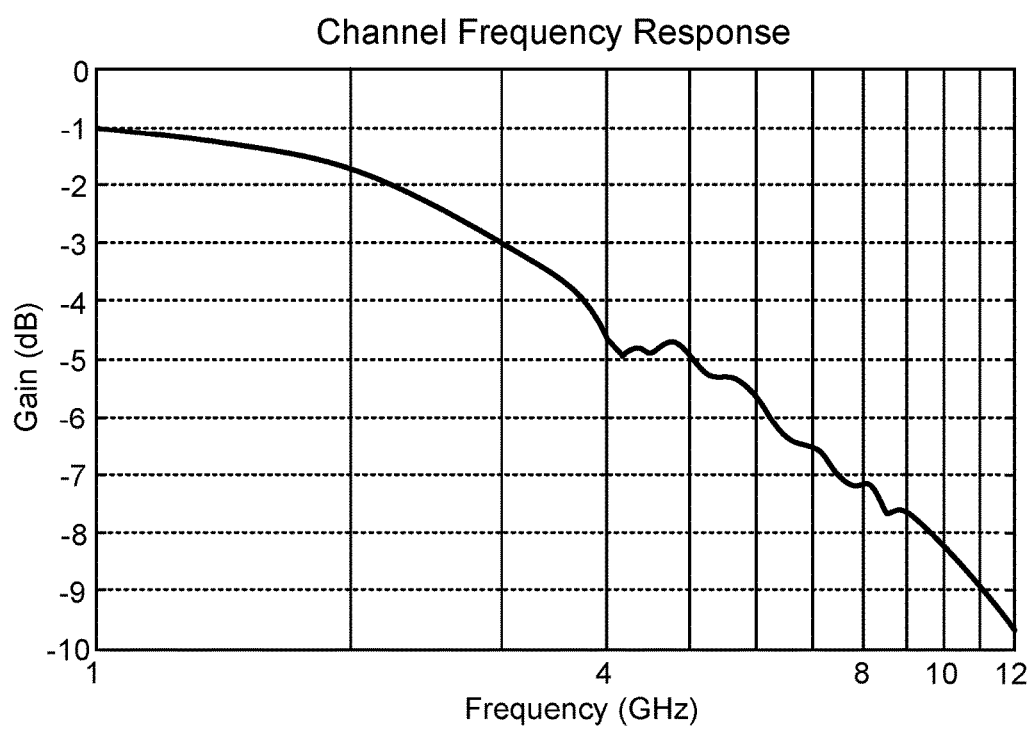
FIG. 5 is a plot illustrating simulated channel distortion according to an embodiment of the present invention.

Referring to FIG. 2, in order to simulate the channel distortion, the RF signal is passed through a low pass filter (LPF) 210, which is discussed in relation to FIG. 5. After the signal is received from the channel at receiver 120, the distorted signal is then provided as an input to the spectral monitoring unit 200, which can include a set (e.g., three) filters that pass predetermined bands. As illustrated, three filters 220, 222, and 224 can be utilized: low pass, bandpass, and high pass, but the present invention is not limited to this configuration. Other numbers of filters with predetermined spectral characteristics can be utilized, for example less than three filters or more than three filters. Moreover, although frequency ranges in the gigahertz are illustrated, other frequencies can be utilized depending on the particular application. The outputs from the spectral filters, providing signals at each of multiple bands, are provided as inputs to a set of RMS detectors coupled to the filters, providing measurements of the power in each spectral band. In FIG. 2, the RMS detectors are illustrated as RMS detectors 230, 232, and 234. The outputs of the RMS detectors provide an indication of the distortion present in the spectrum, and thus can be used to provide feedback for compensation of the channel distortion.

Figure 3:
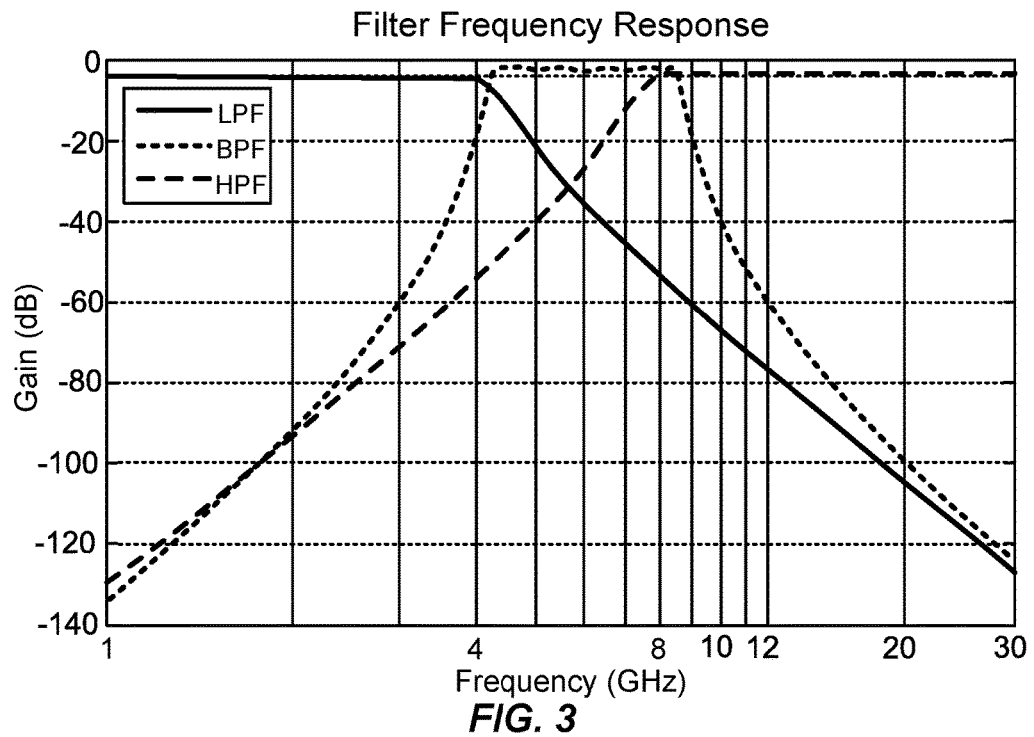
FIG. 3 is a plot illustrating filter frequency response curves according to an embodiment of the present invention.

FIG. 3 is a plot illustrating filter frequency response curves according to an embodiment of the present invention. As can be seen in FIG. 3, the LPF filters signals below 4 GHz, the BPF filters signals between 4 and 8 GHz, and the HPF filters signals above 8 GHz. These particular ranges are not required by the present invention and can be modified as appropriate to the particular implementation. One of ordinary skill in the art would recognize many variations, modifications, and alternatives.

Figure 4:
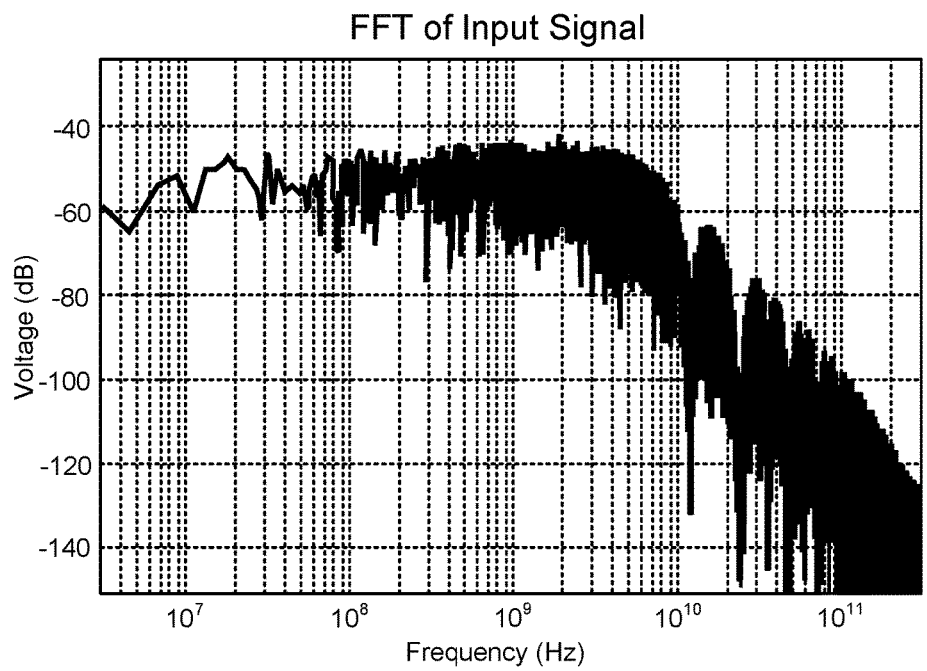
FIG. 4 is a plot illustrating the frequency content of an input signal according to an embodiment of the present invention.

FIG. 4 is plot illustrating the frequency content of an input signal according to an embodiment of the present invention. For this input signal, which is associated with a 12 Gpbs PRBS signal, a dip can be seen in the spectrum at 12 GHz.

In an example, the $V_{RF\_in}$ shown in FIG. 2 is the voltage of a RF signal, and in particular it may be a pseudo random bit series (PRBS) at a desired bit rate (e.g., 12 Gbps), useful for demonstrating the operation of the methods and systems described herein.

FIG. 5 is a plot illustrating simulated channel distortion according to an embodiment of the present invention. As illustrated in FIG. 5, channel distortion can be modeled and/or simulated by a Low Pass Filter (LPF) with an attenuation of 10 dB between 1 GHz and 12 GHz.

Figure 6:
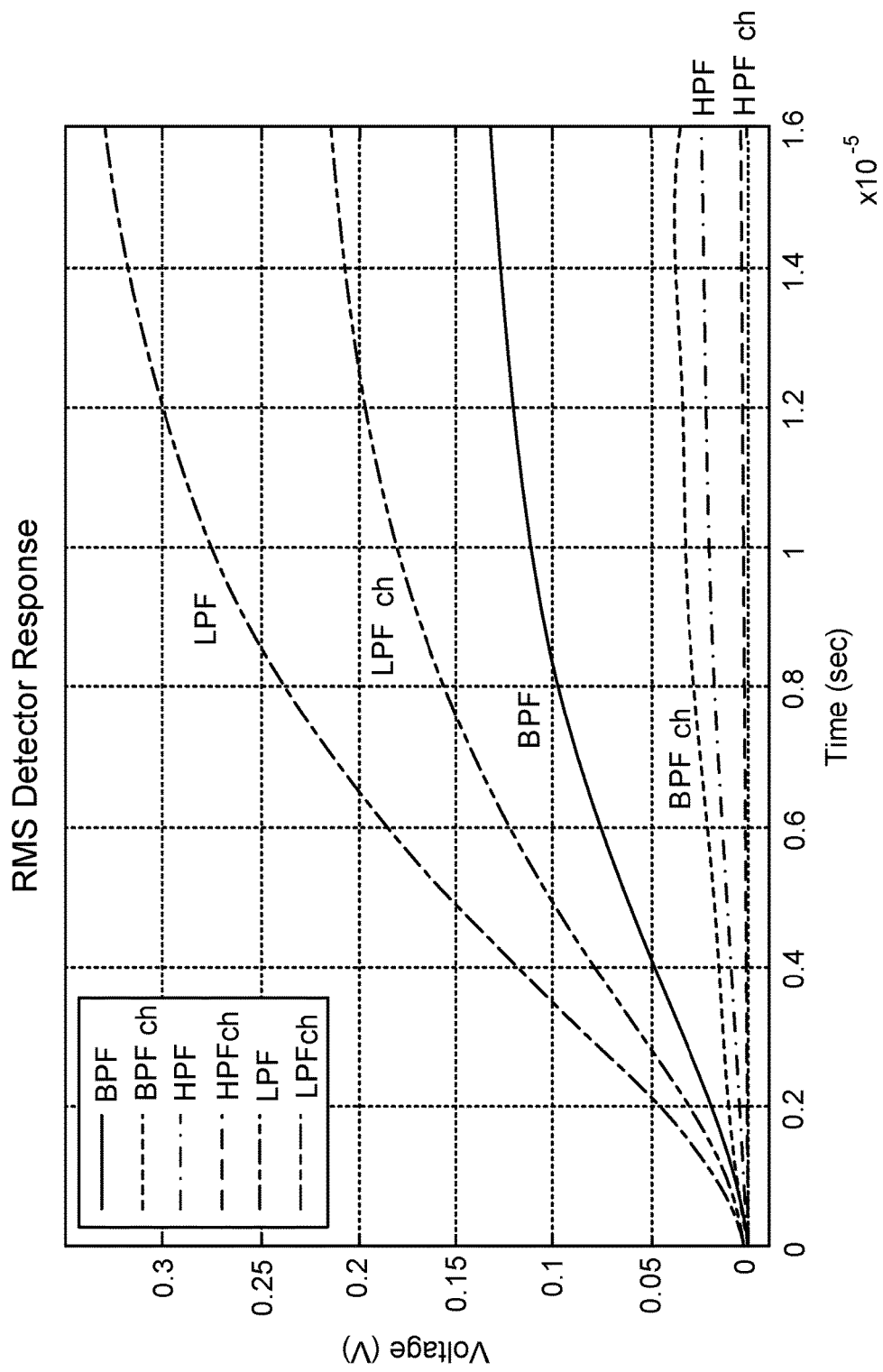
FIG. 6 is a plot illustrating RMS detector response for various filters according to an embodiment of the present invention.

FIG. 6 is a plot illustrating RMS detector response for various filters according to an embodiment of the present invention. Referring to FIG. 6, the output of the set of RMS detectors is illustrated as "RMS Detector Response," showing the difference between the output, for example, of the low pass filter with no channel distortion (LPF) and the output of the low pass filter with the channel distortion applied (LPF ch). Curves for the other spectral filters show similar decreases in RMS detector output when channel distortion is introduced—BPF and BPF ch; HPF and HPF ch. As illustrated in FIG. 6, the RMS detector output is lower for each of the filtered signals when channel distortion is included.

Thus, the use of the analog detector (e.g., an RMS detector) to measure the output power in the various spectral bands enables a measurement of the impact of the introduction of channel distortion (represented by a decrease in output response in this example), which can then be used to provide a feedback signal to compensate for the channel distortion. Because the analog circuits can be monolithically integrated, they can be used in place of digital circuits that could be used to provide the feedback control signals. As an example, if no channel distortion is present, the received signal may be flat as a function of frequency, resulting in equal voltages at each of RMS detectors 230, 232, and 234. When channel distortion is present, attenuation at some frequencies can result in a decrease in the voltage measured at one or more of the RMS detectors (e.g., attenuation of low frequencies in comparison to high frequencies). The relative voltage decrease, which is seen to be highest at the HPF, where the signal was attenuated the most, can provide data used in the feedback loop to the transmitter to compensate for the channel distortion and return the RMS voltages to a common level. One of ordinary skill in the art would recognize many variations, modifications, and alternatives.

In summary, embodiments provide spectral monitoring of a digital signal such that channel distortion can be detected and feedback provided for signal equalization. In an embodiment, a PRBS at 12 Gbps is generated and represented by +/−0.15 V. Referring to FIG. 2, the spectrum can be filtered, using analog filters, into three spectral bands. The signals, after filtering, are each passed to one of a set of RMS detectors, which are used to measure the power present in each spectral band. Assuming uniform signals as a function of frequency, if the signal is distorted by the channel, then the output power at each RMS detector will change. Thus, the distortion resulting from the channel will be detected and can be used to provide feedback for the equalization of the signal at transmission.

Figure 7:
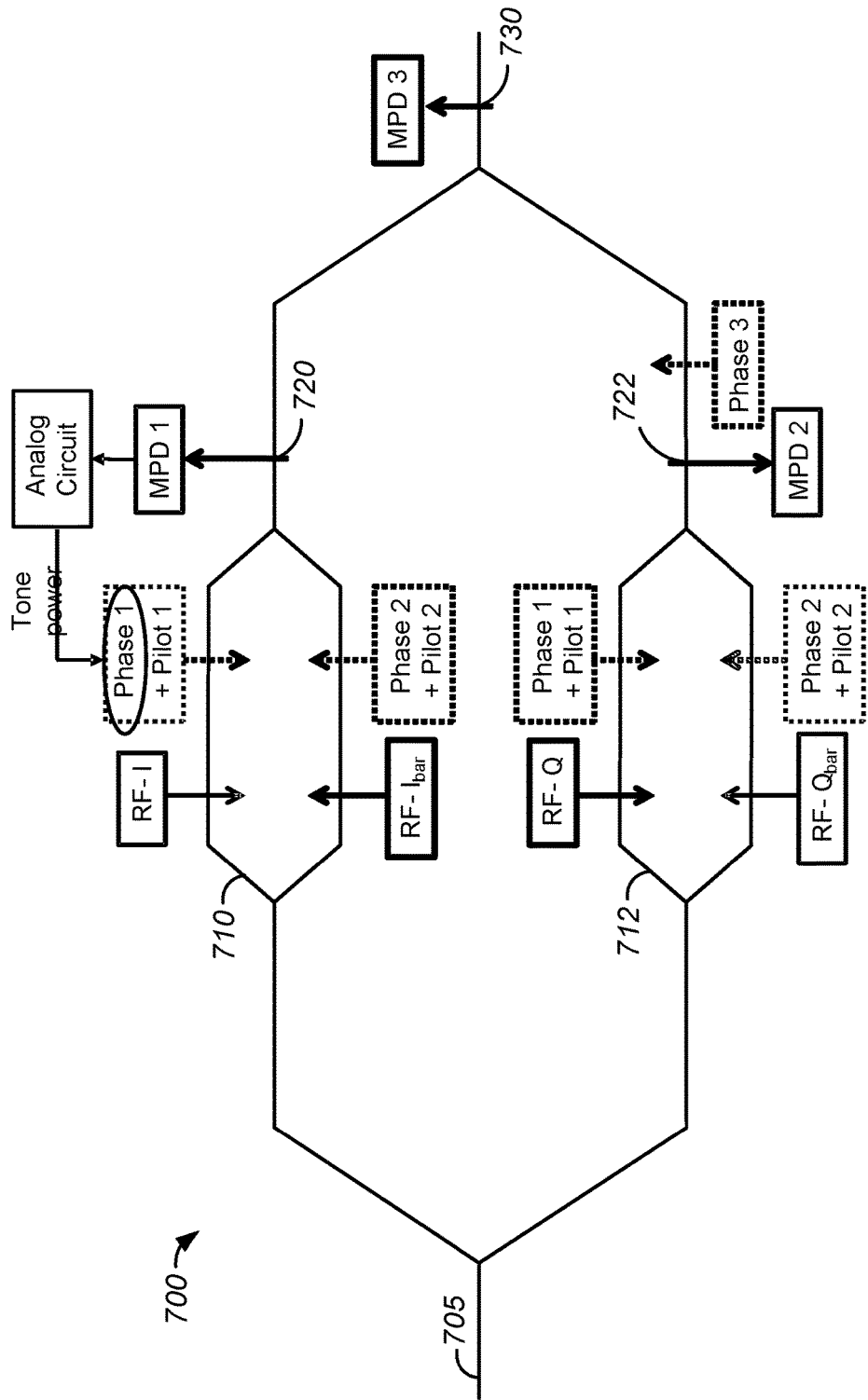
FIG. 7 is a simplified schematic diagram illustrating a nested modulator system according to an embodiment of the present invention.

FIG. 7 is a simplified schematic diagram illustrating a nested modulator system according to an embodiment of the present invention. This nested modulator system allows for control of null bias in an optical Mach-Zehnder Modulator (MZM) as described below.

As described more fully below, the embodiment discussed in relation to FIG. 7 includes a design for a control loop to maintain the bias point of an optical MZM. As a specific example, this control technique can be used to maintain the null bias in a Binary Phase Shift Keying (BPSK) modulation format. In addition to BPSK, this control technique can be used for the inner modulators in a nested MZM configuration for QPSK, DQPSK, or DP-QPSK. One of ordinary skill in the art would recognize many variations, modifications, and alternatives.

Referring to FIG. 7, the nested MZM configuration includes two inner MZMs, first MZM 710 and second MZM 712 connected together within an outer MZM 700. MZM 700 includes an input port 705 and an output port at node 730. For QPSK, each MZM uses a specific bias point for operation:

The bias point of the inner MZMs 710 and 712 is maintained such that the output of the inner MZMs when the arms are not driven otherwise, is a minimum (null bias). The two high-speed RF inputs (e.g. RF-I and RF-$I_{bar}$) drive the two arms (e.g. with diodes) to obtain two outputs that are π phase shifted from each other.

The bias point of the outer MZM 700 is maintained such that the output of the inner MZMs are 90° out of phase (i.e., π/2) with one another (quadrature bias), as discussed below.

The control loop for null bias relies on the application of two pilot tones that produce intermodulation tones in the output signal of the MZM. A peak detector analog circuit is then used to monitor the intensity of the odd intermodulation frequencies, and provide the feedback to maximize this quantity and maintain the null bias.

Referring to FIG. 7, the first inner MZM 710 receives I and $I_{bar}$ signals and the second inner MZM 712 receives the Q and $Q_{bar}$ signals for the I and Q constellation of the QPSK. Phase control is provided to each inner MZM and is illustrated by Phase 1+Pilot 1/Phase 2+Pilot 2 provide to the upper and lower arms of the inner MZMs as shown in FIG. 7. The power at node 720 is measured using monolithically integrated monitor photodetector (MPD1), the power at node 722 is measured using MPD2, and the power at node 730 is measured using MPD3. Phase 3 is used to modify the phase of the lower arm of the outer MZM 700. A variety of phase adjustment devices can be utilized including heaters integrated with waveguide elements, electro-optic phase adjustment elements including diode-based phase adjustment sections, and the like. It is understood that in each case, only the phase difference between the two arms is of importance, and the actual phase shifters can be applied to one or both of the arms of each MZ (inner or outer).

Figure 8A:
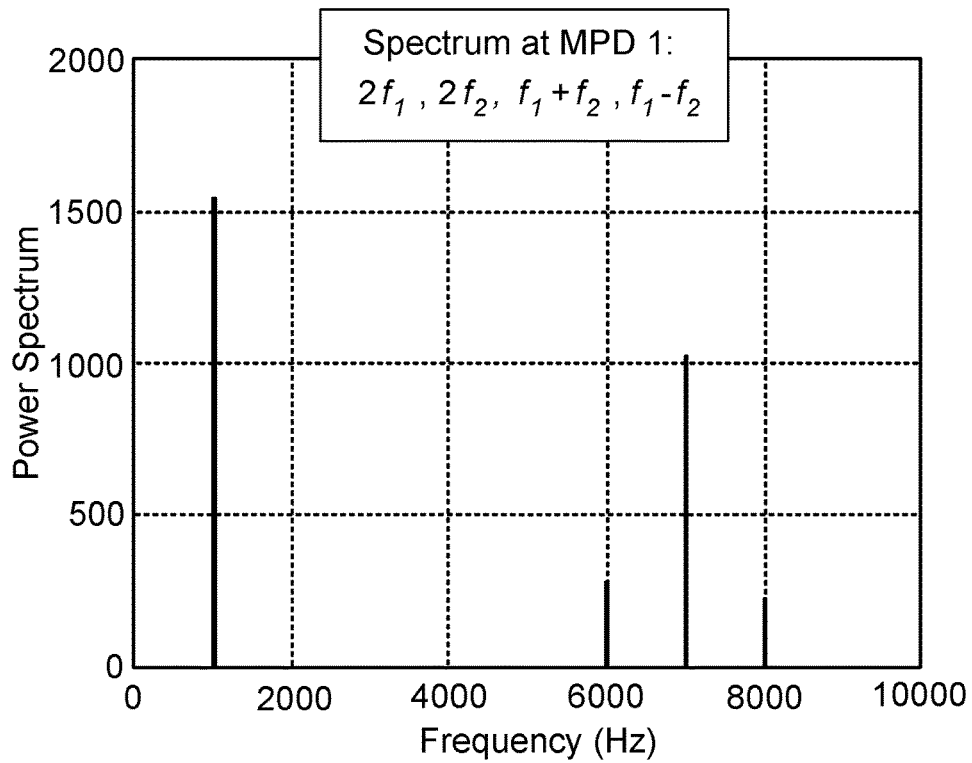
FIG. 8A is a plot illustrating spectral content measured at a detector according to an embodiment of the present invention.

FIG. 8A is a plot illustrating spectral content measured at a detector according to an embodiment of the present invention. For this embodiment, Pilot Tone 1 ($f_1$) was set at 3 kHz and Pilot Tone 2 ($f_2$) was set at 4 kHz. FIG. 8A shows the spectrum measured at MPD1, with peaks in the power spectrum at $2f_1$ (6 kHz), $2f_2$ (8 kHz), $f_1+f_2$ (7 kHz), and $f_1-f_2$ (1 kHz).

Figure 8B:
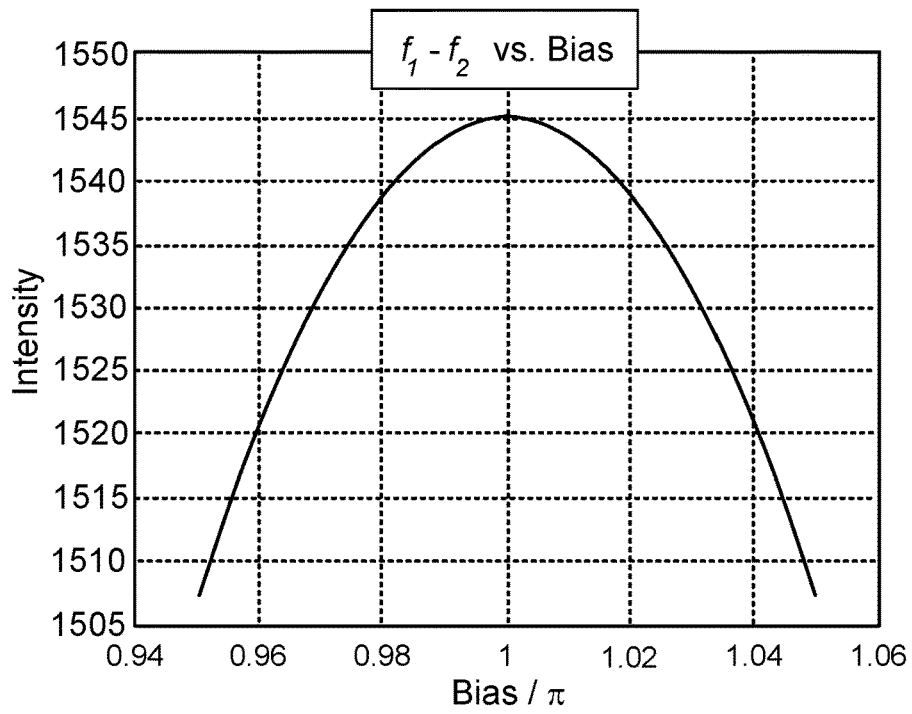
FIG. 8B is a plot illustrating power as a function of modulator bias according to an embodiment of the present invention.

FIG. 8B is a plot illustrating power as a function of modulator bias according to an embodiment of the present invention. FIG. 8B displays the inter-modulation power at $f_1-f_2$, which is related to the nonlinear transfer function of the MZM. By measuring the power in the inter-modulation spectrum, a feedback signal is provided that can be used to control-loop the phase shift, preferably at it in this example. The phase can be adjusted until the inter-modulation spectrum is maximized, providing the desired null ($\pi$) bias point.

In the embodiment illustrated in FIG. 7, power measurements are made using the MPD1 and MPD2 (which detect intensity) to determine that a $\pi$ phase shift is present between the two arms of each MZM 710 and 712. In the illustrated example, MPD1 is used to control MZM 710 by measuring the power at the inter-modulation frequency of 1 kHz. Although 3 kHz and 4 kHz are utilized for the pilot tones in this example, the present invention is not limited to these frequencies and other suitable frequencies can be utilized as appropriate to the particular application. The pilot tones can be applied to separate arms or can be applied to the same arm. Although not illustrated in FIG. 7 for purposes of clarity, the power measured at MPD2 can be used to control Phase 2 in the lower arm of MZM 712. Thus, the description that is provided in relation to MPD1 and MZM 710 is also applicable, as appropriate, to MPD2 and MZM 712. One of ordinary skill in the art would recognize many variations, modifications, and alternatives.

Referring once again to FIG. 8B, the desired $\pi$ bias is correlated to the power of the inter-modulation tone ($f_1-f_2$) and by maximizing this tone, the desired $\pi$ bias can be maintained. Thus, the control loop will maximize this tone in this implementation to achieve the desired null bias on MZMs 710 and 712. It should be noted that these same techniques can be used for control of individual BPSK MZMs. Thus, although a QPSK configuration is illustrated in FIG. 7, this is not required by the present invention and this null bias technique can be implemented for a single BPSK modulator as well. One of ordinary skill in the art would recognize many variations, modifications, and alternatives.

Figure 9:
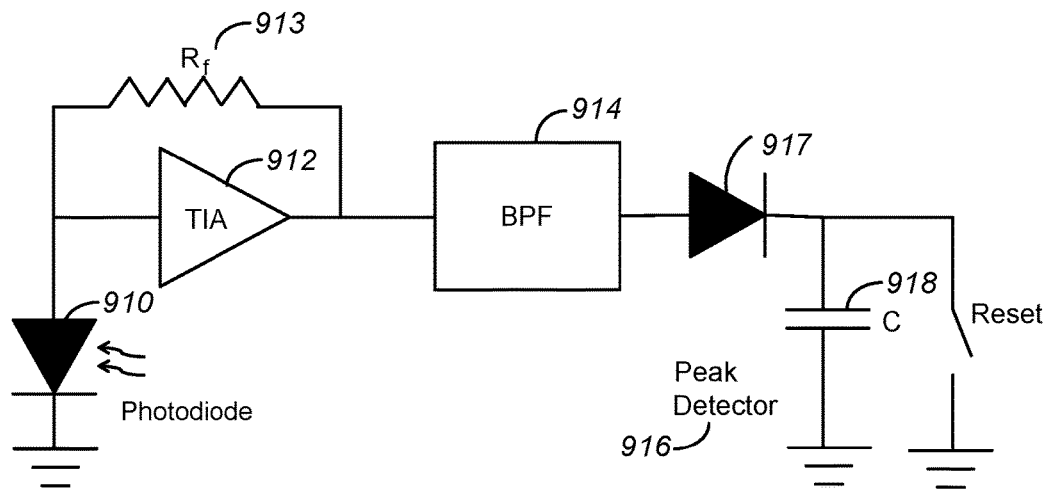
FIG. 9 is a simplified block diagram illustrating a peak detector according to an embodiment of the present invention.

FIG. 9 is a simplified block diagram illustrating a peak detector according to an embodiment of the present invention. The exemplary analog circuit (i.e., peak detector circuit) illustrated in FIG. 9 can be used to follow the power of the signal at the output of the MZMs, including MZM 710, MZM 720, or MZM 700 in real time in order to maximize the inter-modulation tone. The monitor photodiode 910 measures the power of the output of the MZM, which is amplified using transimpedance amplifier (TIA) 912 with resistor 913 in parallel, filtered using the band pass filter (BPF) 914, passed to the peak detector 916, which includes a diode 917, and capacitor 918, which measures the peak power. Thus, by monitoring the intensity using the MPDs illustrated in FIG. 7, which may include the peak detector shown in FIG. 9, the signal applied to the phase shifter (e.g. Phase 1 or Phase 2 in FIG. 7) can be modified to maximize the measured signal and thus the null bias. In an embodiment, phase shifters can be implemented using thermal devices (e.g., heaters) or other suitable systems to adjust the phase in the MZM arms.

Figure 10:
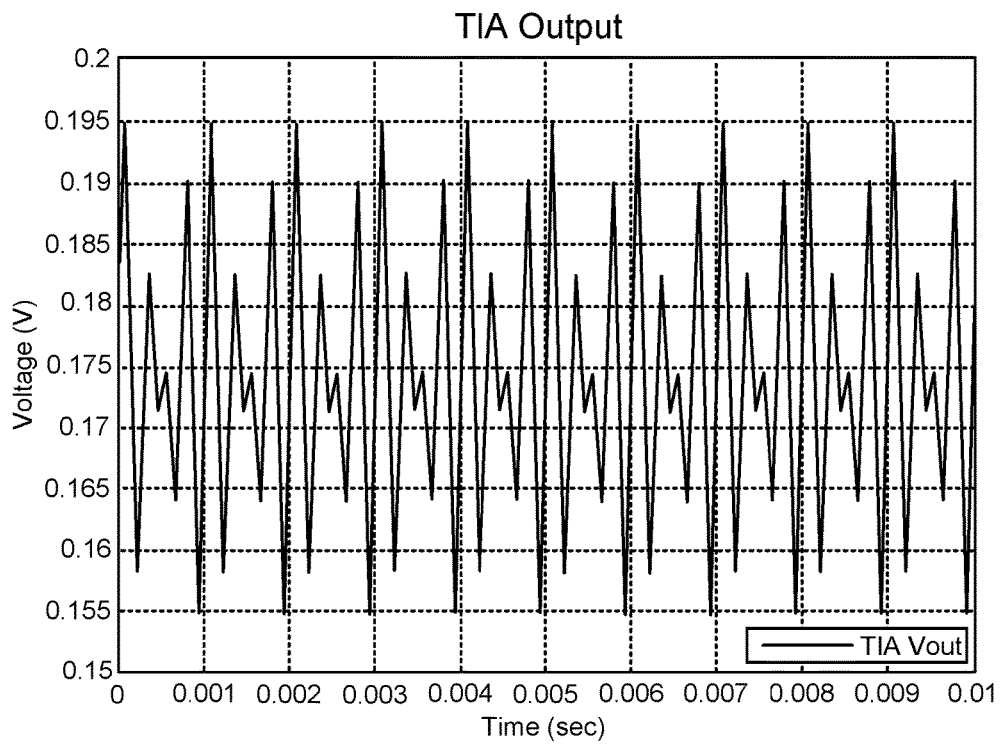
FIG. 10 is a plot illustrating the output of a transimpedance amplifier according to an embodiment of the present invention.
Figure 11:
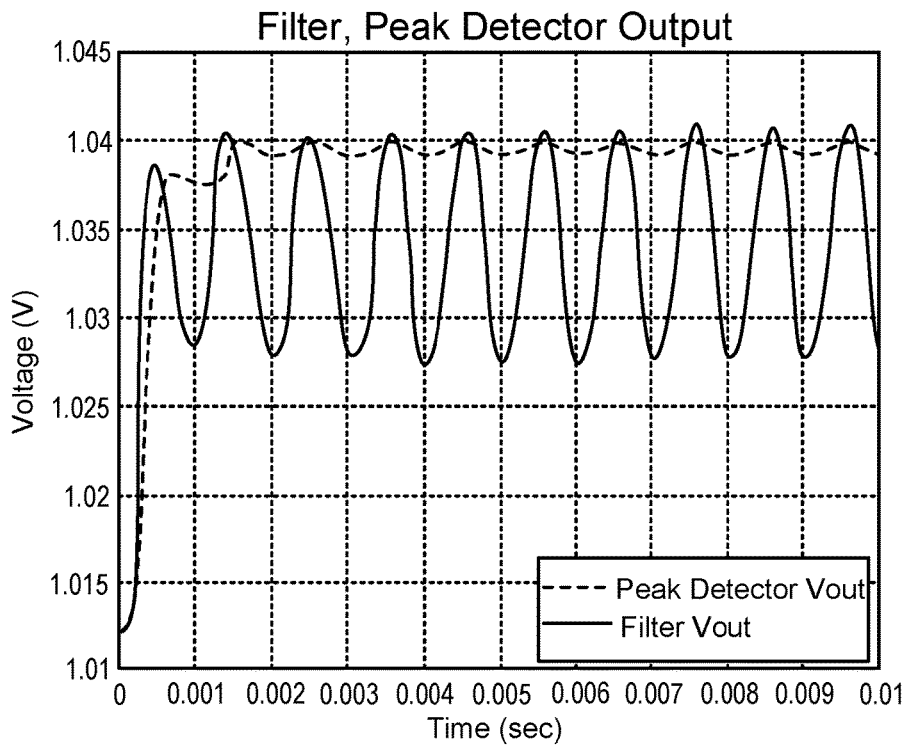
FIG. 11 is a plot illustrating the peak detector output and the filter output according to an embodiment of the present invention.

FIG. 10 is a plot illustrating the output of a transimpedance amplifier according to an embodiment of the present invention. The output of TIA 912 oscillates as a function of time as illustrated. FIG. 11 is a plot illustrating the peak detector output and the filter output according to an embodiment of the present invention. As shown in FIG. 11, the output of BPF 914 shows a reduced oscillation amplitude, and number of oscillations (as only the low frequency of interest is kept), in comparison to the TIA output. The output of peak detector 916 is substantially constant as it is associated with the voltage on the peak detector capacitor 918. Thus, using the peak detector illustrated in FIG. 9, the MPDs are able to provide a measure of the RMS power at the various nodes as illustrated.

Figure 12:
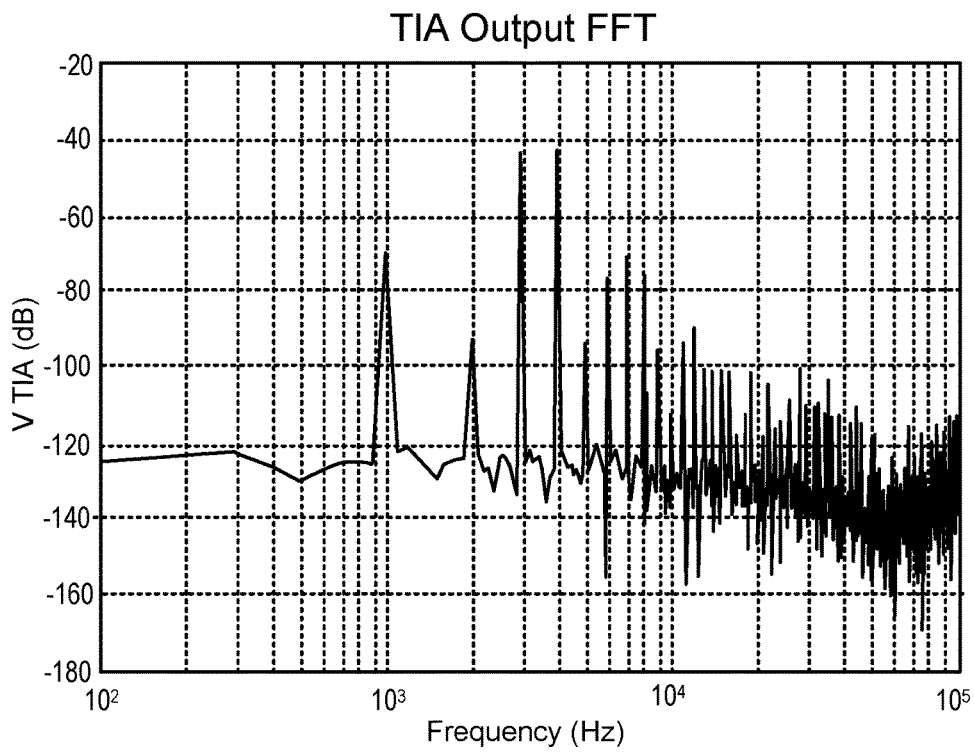
FIG. 12 is plot illustrating the spectrum of the transimpedance amplifier according to an embodiment of the present invention.

FIG. 12 is plot illustrating the spectrum of the transimpedance amplifier according to an embodiment of the present invention.

Figure 13:
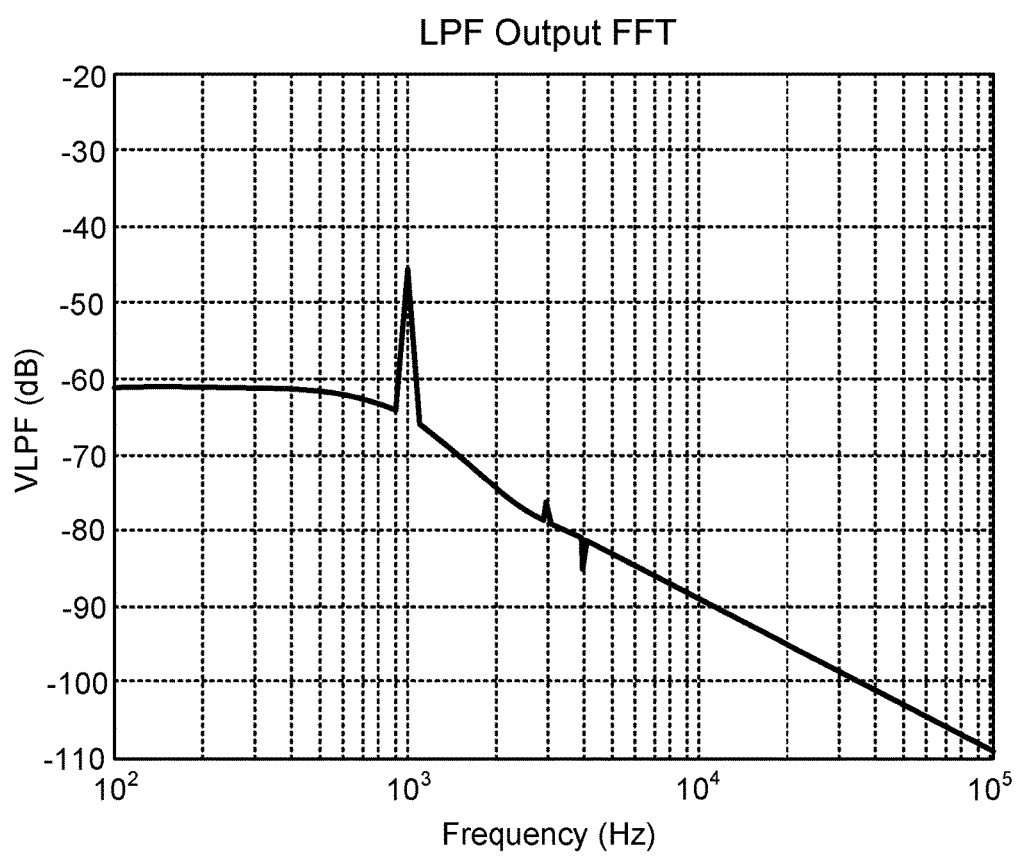
FIG. 13 is a plot illustrating the spectrum of the filter output according to an embodiment of the present invention.

FIG. 13 is a plot illustrating the spectrum of the filter output (BPF 914 as illustrated in FIG. 9) according to an embodiment of the present invention. As illustrated in FIG. 13, a peak is present at 1 kHz, which is associated with the difference frequency between the two pilot tones.

Figure 14:
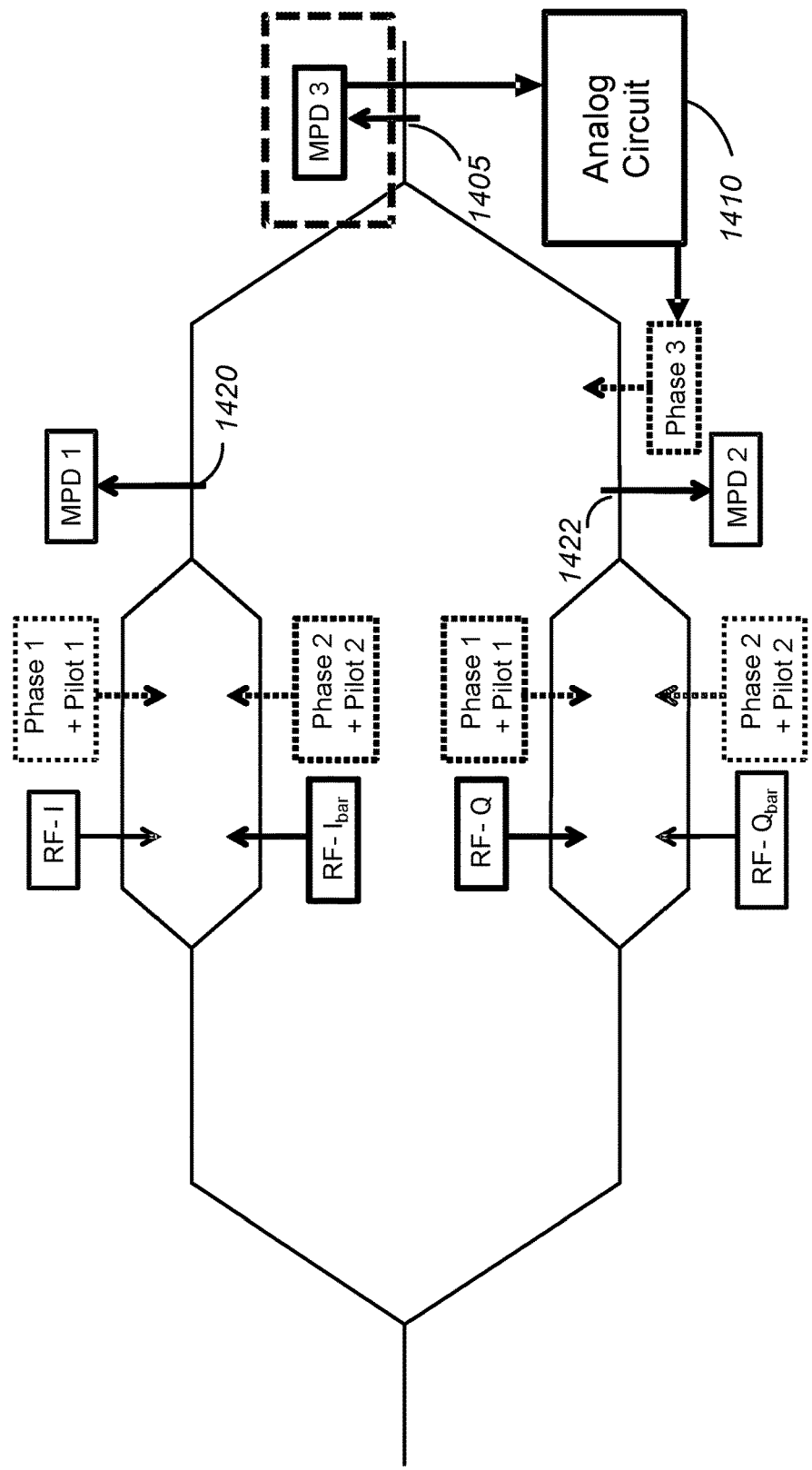
FIG. 14 is simplified schematic diagram illustrating a nested modulator system according to another embodiment of the present invention.

FIG. 14 is a simplified schematic diagram illustrating a nested modulator system according to another embodiment of the present invention. In the nested modulator system illustrated in FIG. 14, which shares common elements with the nested modulator system shown in FIG. 7, the power measured at node 1405 is utilized to adjust the phase applied to the modulator arm by Phase 3. Within the QPSK modulation format, two independent pseudo-random data streams are applied to the two inner MZMs. The application of the two independent data streams (which are typically uncorrelated) produces broadband "noise" at the output of the outer MZM when the quadrature bias is not maintained. As illustrated in FIG. 14, an RMS analog circuit 1410 is used in conjunction with monitor photodiode MPD3 to detect the power and reduce or minimize the noise generated and to maintain the quadrature bias.

The "noise" is correlated to the phase error in relation to the desired phase shift of $\pi/2$. Accordingly, a portion of the broadband noise is sampled and reduced or minimized to achieve the desired phase shift. As illustrated, MPD3 can be used to control the bias associated with Phase 3, providing for quadrature on the outer MZM. Thus, in this embodiment, the integrated AC time signal power or the integrated power spectrum is reduced or minimized to control the quadrature bias.

Mathematically, the control of the quadrature bias through reductions in the broadband noise can be described as follows:

$$E = e^{-j\varphi_1(t)} + e^{-j\varphi_2(t)}e^{-j\varphi_b}, \text{ where}$$

$$\varphi_1 = I\frac{\pi}{2}, \varphi_2 = Q\frac{\pi}{2}, \text{ and } \varphi_b = \frac{\pi}{2} + \Delta\varphi_b,$$

where $\varphi_1$ is the relative phase at node 1420 (after the first inner MZM), $\varphi_2$ is the relative phase at node 1422 (after the second inner MZM), $\varphi_b$ is the bias applied by Phase 3 and $\Delta\varphi_b$ is the error in the phase, and E is the combined electrical field at 1405 after the inner MZMs coherently combine.

The power measured at MPD3 is proportional to:

$$P_D(t) = EE^* = 2[1 + \cos(\varphi_1 - \varphi_2 - \varphi_b)]$$

$$P_D(t) = 2\{1 + \sin[(I-Q)\frac{\pi}{2} - \Delta\varphi_b]\}.$$

The AC component is $$P_{D,AC}(t) = 2\sin[(I-Q)\frac{\pi}{2} - \Delta\varphi_b].$$

Since I and Q can only receive the values ±1 we have $$(I-Q) = \begin{cases} 0 \\ -2, \\ 2 \end{cases}$$

and then for all three cases $P_{D,AC}(t)=0$ if $\Delta\varphi_b=0$. Thus, by adjusting Phase 3, the power measured at MPD3 can be driven towards zero as $\Delta\varphi_b=0$.

Figure 15:
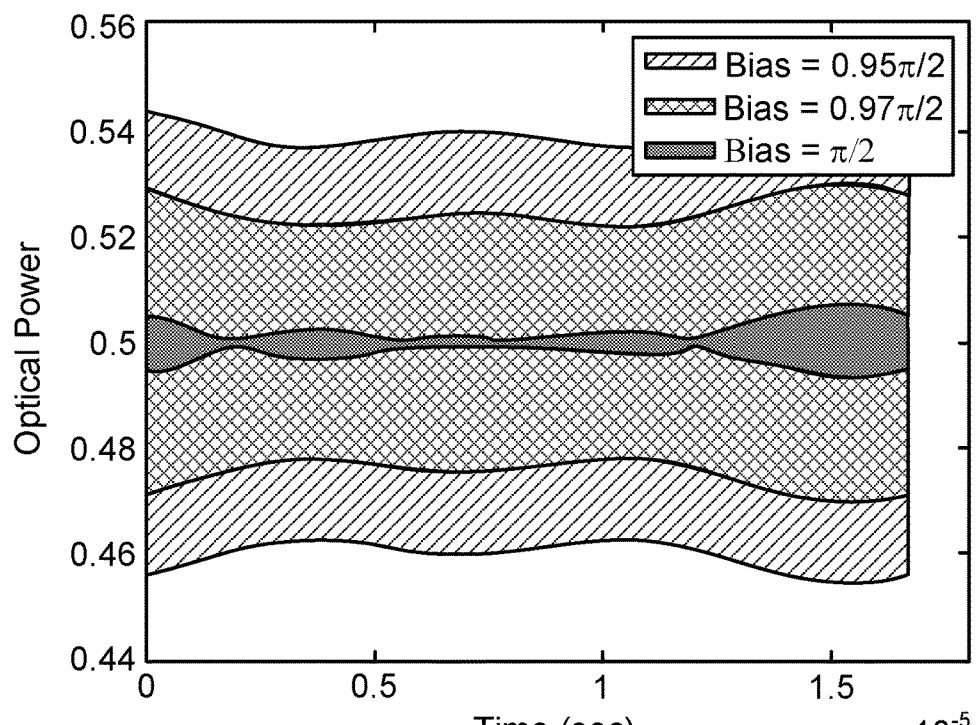
FIG. 15 is a plot illustrating optical power as a function of time for various biases according to an embodiment of the present invention.

FIG. 15 is a plot illustrating optical power as a function of time for various biases according to an embodiment of the present invention. For the bias equal to 0.95π/2, the optical power associated with the "noise" in the data ranges from about 0.46 to about 0.54 on a normalized power basis (i.e., arbitrary units). As the bias is adjusted closer to the π/2 objective, i.e., to 0.97π/2, the optical power decreases to a range of about 0.48 to about 0.52. For a bias level at the desired π/2, the optical power amplitude fluctuation associated with the noise is negligible. Thus, reductions in the noise level towards a constant (DC) output power can be used to determine if the bias is at the desired value.

Figure 16:
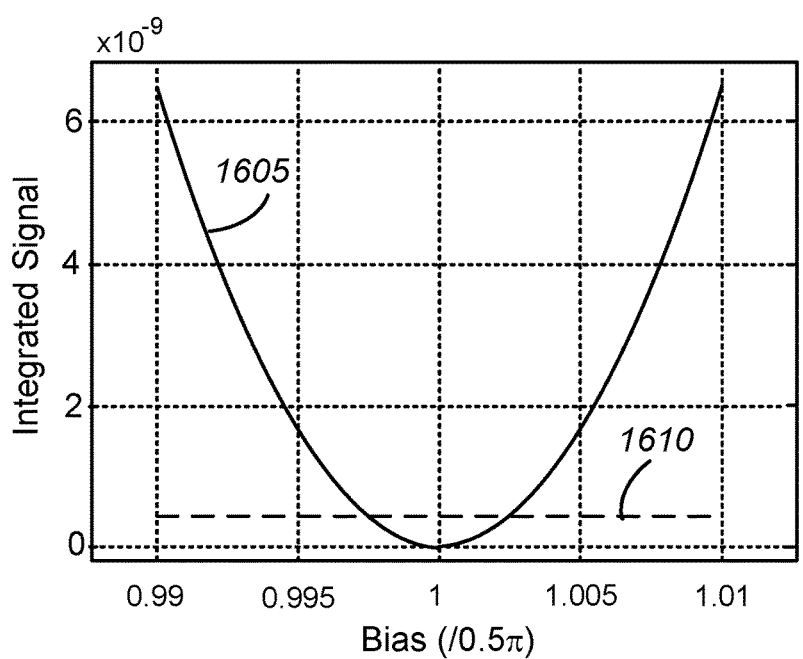
FIG. 16 is a plot illustrating integrated signal as a function of bias according to an embodiment of the present invention.

FIG. 16 is a plot illustrating integrated signal as a function of bias according to an embodiment of the present invention. The noise power (i.e., the integrated signal over a 1 GHz bandwidth) 1605 is plotted as a function of bias normalized to π/2. Although some embodiments utilize an RF signal with a wide bandwidth (e.g., 30 GHz), a portion of the wide band noise (e.g., 1 GHz) can be used according to an embodiment of the present invention. By measuring the noise level and reducing the noise level, it is possible to provide better than 1% control over the quadrature bias, which corresponds to less than 0.5°. Although a "noise" power bandwidth of 1 GHz is utilized in FIGS. 15 and 16, this is not required by the present invention and other bandwidths can be utilized.

Curve 1610 in FIG. 16 represents the noise level resulting from other system elements, providing a floor for minimization. Thus, embodiments of the present invention can reduce the noise associated with the phase error to less than the noise floor from other system elements.

Figure 17:
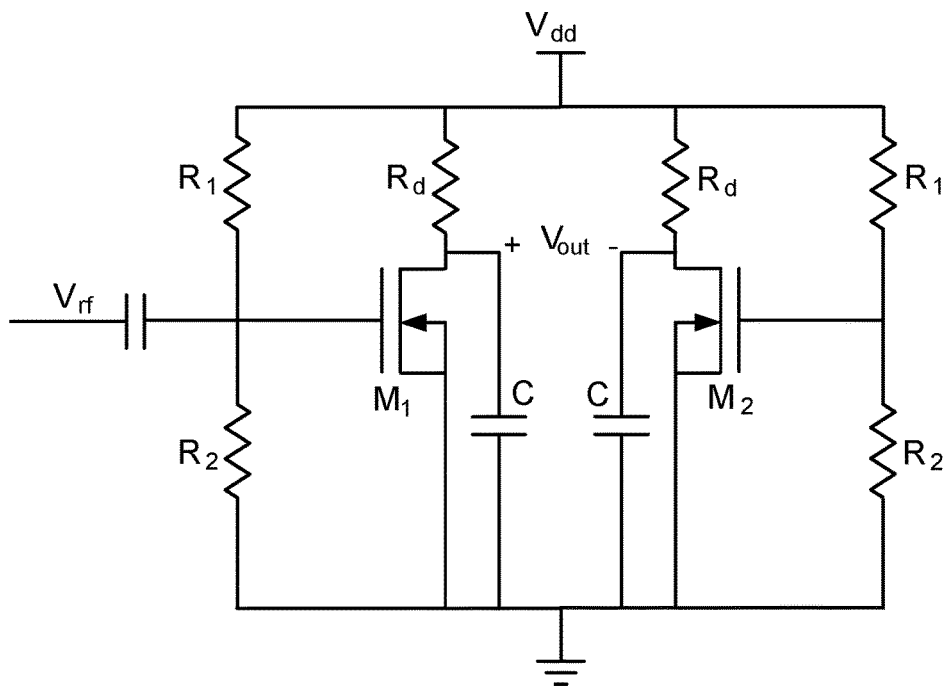
FIG. 17 is a simplified circuit diagram for a power detector according to an embodiment of the present invention.

FIG. 17 is a simplified circuit diagram for a power detector according to an embodiment of the present invention. The exemplary RMS circuit illustrated in FIG. 17 can receive the filtered noise signal. The output indicates the power present in the filtered noise band.

For the power detector illustrated in FIG. 17, if the input signal is AC coupled, squared, and low pass filtered, it is possible to obtain an output voltage that is proportional to the square of the RMS voltage.

For an input signal:

$$V(\omega t) = \frac{a_0}{2} + \left[\sum_{n=1}^{\infty} a_n \sin(n\omega t) + \sum_{n=1}^{\infty} b_n \cos(n\omega t)\right].$$

If the input signal is AC coupled and the result squared:

$$V^2(\omega t) = k[\Sigma_{n=1}^{\infty} a_n \sin(n\omega t) + \Sigma_{n=1}^{\infty} b_n \cos(n\omega t)]^2.$$

After low pass filtering, the output voltage is:

$$V_{out} = \frac{k'}{2}\left[\sum_{n=1}^{\infty} a_n^2 + \sum_{n=1}^{\infty} b_n^2\right] = k' \sum_{n=1}^{\infty} V_{RMS,n}^2 = k' V_{RMS}^2.$$

Figure 18:
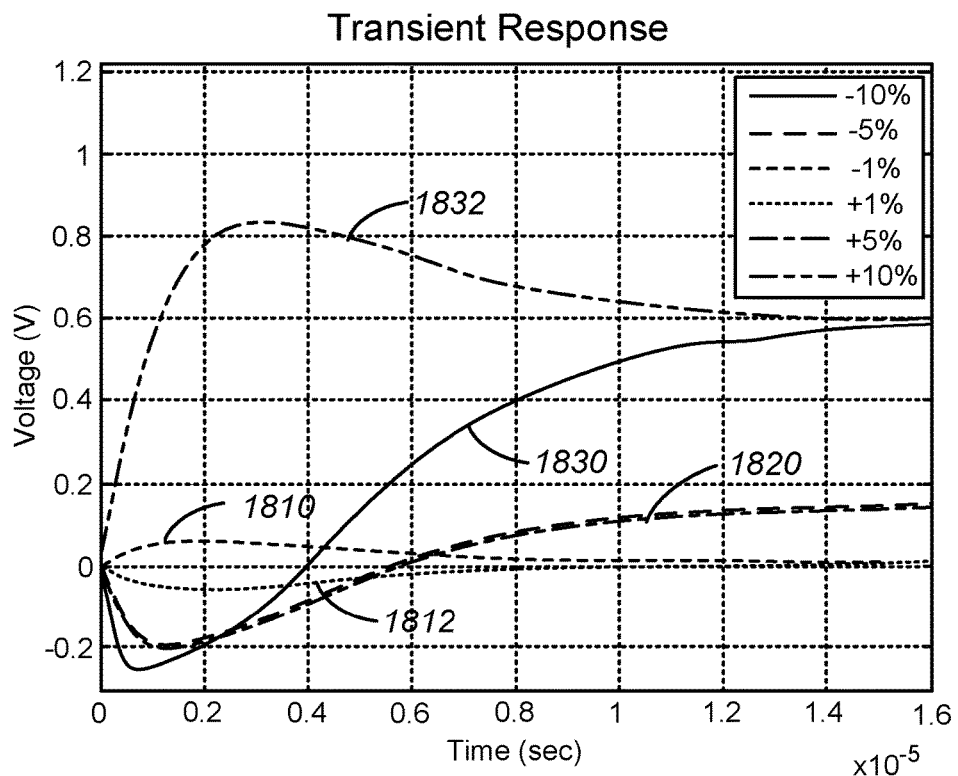
FIG. 18 is a plot illustrating transient response at the output of the power detector according to an embodiment of the present invention.

FIG. 18 is a plot illustrating transient response at the output of the power detector according to an embodiment of the present invention. For a phase error of −1% to +1%, the output voltage is represented by the curves 1810 and 1812, respectively, which are characterized by a small amplitude. As the phase error increases to ±5% and ±10%, the output voltage increases as illustrated by curve 1820 (±5%) and curves 1830 (−10%) and 1832 (+10%). As illustrated in FIG. 18, the transient response demonstrates that fast changes can be accomplished.

Figure 19:
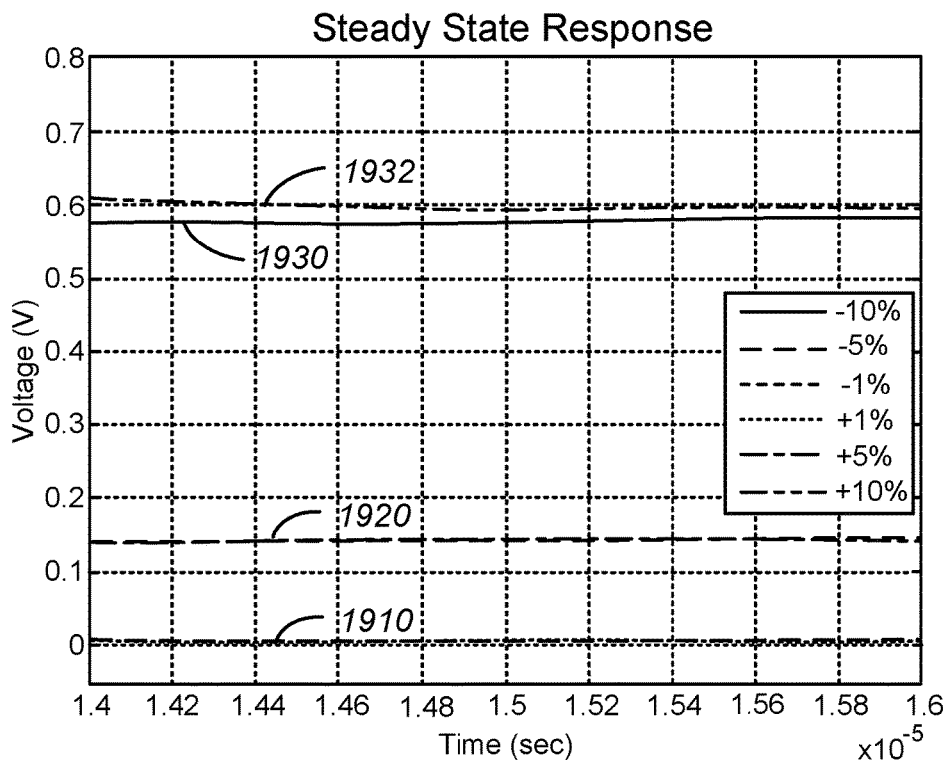
FIG. 19 is a plot illustrating steady state response at the output of the power detector according to an embodiment of the present invention.

FIG. 19 is a plot illustrating steady state response at the output of the power detector according to an embodiment of the present invention. For an error of about 10%, the steady state voltage is about 0.6 V (curve 1930 for −10% and curve 1932 for +10%). As the error decreases, the voltage drops as shown by curve 1920 at ~0.13 V for ±5% and curve 1910 at ~0 V for ±1%.

Figure 20:
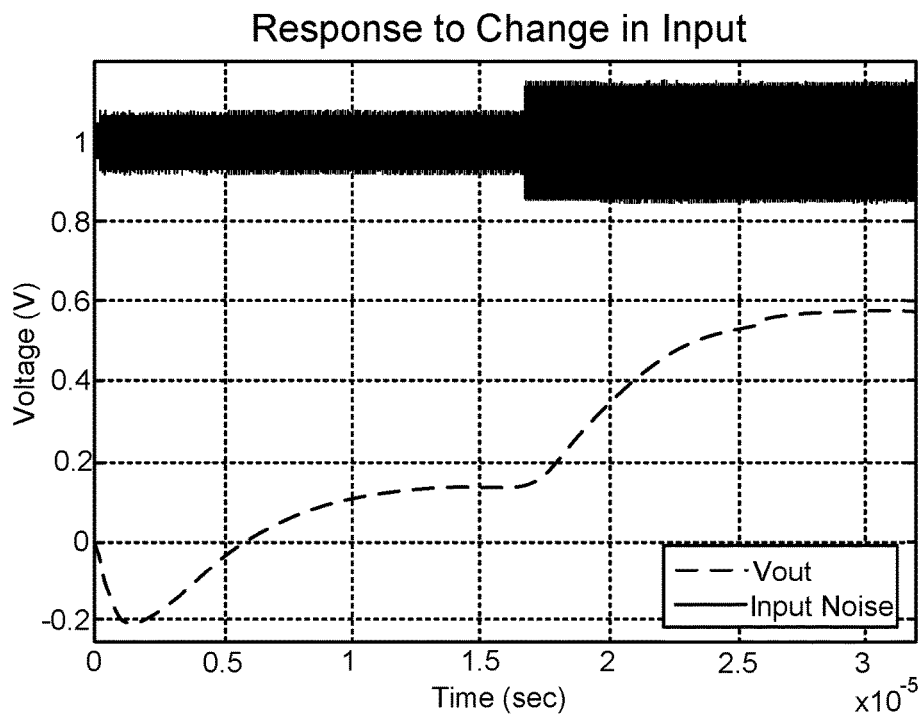
FIG. 20 is a plot illustrating voltage output for changes in input noise according to an embodiment of the present invention.

FIG. 20 is a plot illustrating voltage output for changes in input noise (i.e., abrupt change in the phase bias error) according to an embodiment of the present invention. When the quadrature error was increased from 5% to 10% at a time of about 17 μs, the voltage changed from the steady state value of ~0.15 V to a new steady state value of ~0.6 V in a period of ~10 μs. For systems using thermal control to modify the phase values, time constants of external stimuli are typically on the order of milliseconds. For these systems, the response times of microseconds illustrated in FIG. 20 are fully suitable.

Figure 21:
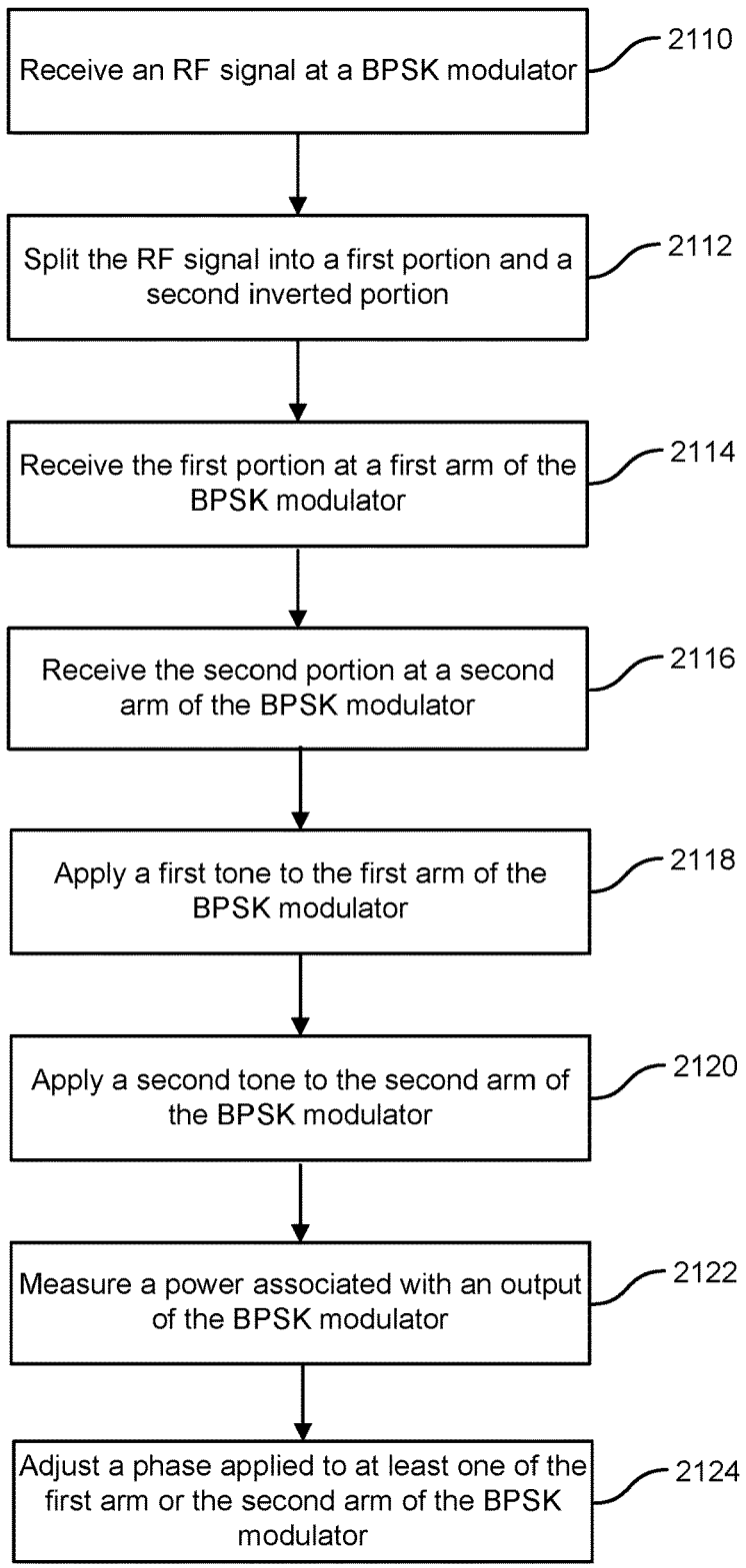
FIG. 21 is a simplified flowchart illustrating a method of operating a BPSK modulator according to an embodiment of the present invention.

FIG. 21 is a simplified flowchart illustrating a method of operating a BPSK modulator. The method includes receiving an RF signal at the BPSK modulator (2110) and splitting the RF signal into a first portion and a second portion that is inverted with respect to the first portion (2112). As illustrated in FIG. 7, the RF I and Q signals are split into inverted signals and applied to the BPSK modulators. The method also includes receiving the first portion at a first arm of the BPSK modulator (2114) and receiving the second portion at a second arm of the BPSK modulator (2116).

The method further includes applying a first tone to the first arm of the BPSK modulator (2118) and applying a second tone to the second arm of the BPSK modulator. Additionally, the method includes measuring a power associated with an output of the BPSK modulator (2122) and adjusting a phase applied to at least one of the first arm of the BPSK modulator or the second arm of the BPSK modulator in response to the measured power (2124). Adjusting the phase can include increasing the power associated with the output of the BPSK modulator, for example, maximizing the power. In some embodiments, measuring the power associated with the output of the BPSK modulator comprises spectrally filtering the output, for example, by performing band pass filtering at a difference frequency of the first tone and the second tone.

It should be appreciated that the specific steps illustrated in FIG. 21 provide a particular method of operating a BPSK modulator according to an embodiment of the present invention. Other sequences of steps may also be performed according to alternative embodiments. For example, alternative embodiments of the present invention may perform the steps outlined above in a different order. Moreover, the individual steps illustrated in FIG. 21 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 22:
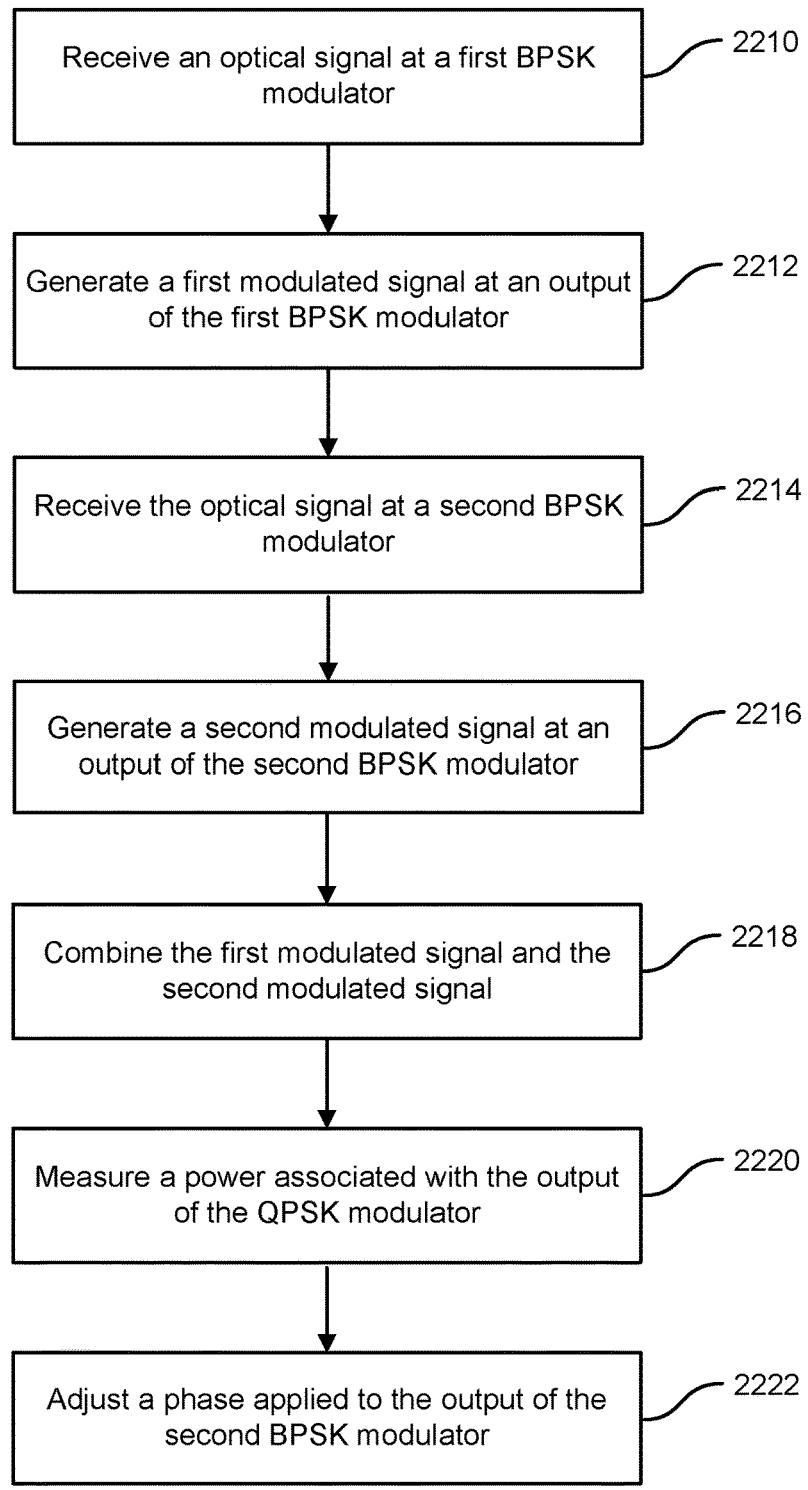
FIG. 22 is a simplified flowchart illustrating a method of operating a QPSK modulator according to an embodiment of the present invention.

FIG. 22 is a simplified flowchart illustrating a method of operating a QPSK modulator. The method includes receiving an optical signal at a first BPSK modulator (2210) and generating a first modulated signal at an output of the first BPSK modulator (2212). In an embodiment, the optical signal is a cw signal provided by a laser source. The method further includes receiving the optical signal at a second BPSK modulator (2214) and generating a second modulated signal at an output of the second BPSK modulator (2216).

The method also includes combining the first modulated signal and the second modulated signal at an output of the QPSK modulator (2218) and measuring a power associated with the output of the QPSK modulator (2220). As illustrated in FIG. 14, measuring the power can include the use of an RMS analog circuit. Also, measuring the power can include spectrally filtering the output of the QPSK modulator into one or more spectral bands before passing the filtered signal to detectors, for example, by applying a 1 GHz bandwidth bandpass filter to the output. Additionally, the method includes adjusting a phase applied to the output of the second BPSK modulator in response to the measured power (2222). It should be understood that it is only the phase difference between the two BPSK modulators is of importance. Thus the phase can be adjusted after each one of the BPSK modulators, or on both of them.

As illustrated in FIG. 16, adjusting the phase applied to the output of the second BPSK modulator can include increasing the phase toward a π/2 bias, resulting in a decrease in power as the integrated signal approaches the minimum at π/2 bias. Moreover, adjusting the phase applied to the output of the second BPSK modulator can include decreasing the phase toward a π/2 bias, resulting in a decrease in power. The phase adjustment can be accomplished in several ways, including adjusting a temperature of a heater associated with the second BPSK modulator.

It should be appreciated that the specific steps illustrated in FIG. 22 provide a particular method of operating a QPSK modulator according to an embodiment of the present invention. Other sequences of steps may also be performed according to alternative embodiments. For example, alternative embodiments of the present invention may perform the steps outlined above in a different order. Moreover, the individual steps illustrated in FIG. 22 may include multiple sub-steps that may be performed in various sequences as appropriate to the individual step. Furthermore, additional steps may be added or removed depending on the particular applications. One of ordinary skill in the art would recognize many variations, modifications, and alternatives.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A receiver that provides feedback for an optical transmitter, wherein the optical transmitter provides optical input into an optical communication channel and the optical input carries an RF signal, the receiver comprising:
   a waveguide for receiving the optical input from the optical communication channel;
   a photodiode that generates an electronic output in response to the RF signal; and
   an analog spectral monitoring unit that generates the feedback, on channel distortion within the optical communication channel, from the electronic output.

2. The receiver of claim 1, wherein the waveguide, the photodiode and the analog spectral monitoring unit are integrated within a silicon photonics chip.

3. The receiver of claim 1, wherein the analog spectral monitoring unit comprises a plurality of spectral filters.

4. The receiver of claim 3, wherein the plurality of spectral filters include:
   a low pass filter that provides a low frequency passband, bounded by an low pass cutoff frequency;
   a high pass filter that provides a high frequency passband, bounded by a high pass cutoff frequency; and
   a bandpass filter that provides a center passband, bounded by the low pass cutoff frequency and the high pass cutoff frequency.

5. The receiver of claim 3, further comprising a plurality of RMS detectors equal in number to the plurality of spectral filters, wherein:
   each of the plurality of spectral filters provides an output passband to a corresponding one of the RMS detectors; and
   each of the RMS detectors provides an output that indicates distortion present in the corresponding output passband.

6. The receiver of claim 1, wherein:
   the waveguide is an input waveguide;
   the receiver further comprises a splitter and rotator that receive a portion of the optical input from the input waveguide, the splitter and rotator being coupled with two output waveguides, wherein:
   the splitter and rotator couple TE polarized light from the input waveguide into a first one of the output waveguides; and
   the splitter and rotator couple TM polarized light from the input waveguide into a second one of the output waveguides.

7. The receiver of claim 6, further comprising a WDM filter, and wherein the TE polarized light and the TM polarized light from the respective first and second output waveguides are filtered by the WDM filter before passing to the photodiode and the analog spectral monitoring unit.

8. The receiver of claim 7, wherein the photodiode is one of a plurality of photodiodes, and the WDM filter directs input light of a different wavelength to each of the plurality of photodiodes.

9. The receiver of claim 1, further comprising a feedback path, and wherein the receiver provides the feedback into the feedback path.

10. The receiver of claim 9, further comprising the optical transmitter, and wherein the feedback path transmits the feedback to the optical transmitter.

11. The receiver of claim 10, the optical transmitter comprising a BPSK modulator, and wherein the receiver measures power associated with an output of the BPSK modulator by spectrally filtering the output of the BPSK modulator.

12. A method for monitoring and controlling an RF signal that is provided by a transmitter into an optical communication channel, the method comprising:
    operably coupling the RF signal, through an input waveguide that carries the optical communications channel, to a receiver;
    generating, with a photodiode in the receiver, an electronic output in response to the RF signal; and
    providing feedback for the transmitter on channel distortion within the optical communication channel, the feedback being generated in response to the electronic output by an analog spectral monitoring unit within the receiver.

13. The method of claim 12, wherein providing the feedback on channel distortion comprises providing the feedback into a feedback path; and
    the steps of generating the electronic output and providing the feedback on channel distortion are performed with the input waveguide, the receiver and the feedback path integrated within a silicon photonics chip.

14. The method of claim 13, wherein:
    the transmitter comprises a BPSK modulator and is integrated within the silicon photonics chip; and
    generating the feedback on channel distortion within the optical communications channel comprises measuring power associated with an output of the BPSK modulator by spectrally filtering the output of the BPSK modulator.

15. The method of claim 12, wherein providing the feedback on comprises filtering the electronic output with:
    a low pass filter that provides a low frequency passband, bounded by an low pass cutoff frequency;
    a high pass filter that provides a high frequency passband, bounded by a high pass cutoff frequency; and
    a bandpass filter that provides a center passband, bounded by the low pass cutoff frequency and the high pass cutoff frequency.

16. The method of claim 12, further comprising:
    utilizing a splitter and a rotator to couple TE polarized light from the input waveguide into a first output waveguide; and
    utilizing the splitter and the rotator to couple TM polarized light from the input waveguide into a second output waveguide.

17. The method of claim 16, wherein the photodiode is one of a plurality of photodiodes, and further comprising:
    directing input light of a different wavelength to each of the plurality of photodiodes, by a WDM filter.

* * * * *